United States Patent [19]

Nagai et al.

[11] Patent Number: 5,709,722
[45] Date of Patent: Jan. 20, 1998

[54] PARTICULATE TRAP FOR DIESEL ENGINE

[75] Inventors: Youichi Nagai; Shunsuke Ban; Tomohiko Ihara, all of Hyogo, Japan

[73] Assignee: Sumitomo Electric Industries, Ltd., Osaka, Japan

[21] Appl. No.: 655,738

[22] Filed: May 30, 1996

[30] Foreign Application Priority Data

| May 30, 1995 | [JP] | Japan | 7-131611 |
| May 30, 1995 | [JP] | Japan | 7-131944 |
| Apr. 19, 1996 | [JP] | Japan | 8-98073 |

[51] Int. Cl.⁶ .................................................. B01D 46/24
[52] U.S. Cl. ..................... 055/499; 55/524; 55/DIG. 30; 60/311
[58] Field of Search .......................... 55/385.3, 498, 55/499, 501, 523, 524, DIG. 10, DIG. 30; 60/299, 311; 422/180, 190, 222

[56] References Cited

U.S. PATENT DOCUMENTS

| 4,662,911 | 5/1987 | Hirayama et al. | 422/180 X |
| 4,872,889 | 10/1989 | Lepperhoff et al. | 55/523 X |
| 4,881,959 | 11/1989 | Kono et al. | 55/523 X |
| 4,975,099 | 12/1990 | Kaser et al. | 55/523 X |
| 5,228,891 | 7/1993 | Adiletta | 55/523 X |
| 5,248,481 | 9/1993 | Bloom et al. | 55/523 X |
| 5,260,035 | 11/1993 | Lachman et al | 55/523 X |
| 5,304,351 | 4/1994 | Tanaka et al. | 422/180 |
| 5,403,558 | 4/1995 | Kono et al. | 422/180 X |
| 5,492,679 | 2/1996 | Ament et al. | 55/523 X |
| 5,560,757 | 10/1996 | Suzuki et al. | 55/523 X |

FOREIGN PATENT DOCUMENTS

| 0 469 277 | 2/1992 | European Pat. Off. . |
| 0 501 138 | 9/1992 | European Pat. Off. . |
| 0 606 071 | 7/1994 | European Pat. Off. . |
| 626 188 | 11/1994 | European Pat. Off. . |
| 0 640 382 | 3/1995 | European Pat. Off. . |
| 40 12 719 | 10/1991 | Germany . |
| 41 30 629 | 3/1993 | Germany . |
| 54-110189 | 8/1979 | Japan . |
| 58-45715 | 3/1983 | Japan . |
| 61-46216 | 3/1986 | Japan . |
| 62-149316 | 7/1987 | Japan . |
| 1-304022 | 12/1989 | Japan . |
| 4-339120 | 11/1992 | Japan . |
| 58-137423 | 8/1993 | Japan . |

*Primary Examiner*—Robert H. Spitzer
*Attorney, Agent, or Firm*—Wenderoth, Lind & Ponack

[57] ABSTRACT

A particulate trap for diesel engine use which is less likely to vibrate or deform under exhaust pressures achieves goods results in particulate trapping properties, pressure drop, durability and regenerating properties. This trap has a filter element having a plurality of flat or cylindrical filters of three-dimensionally reticulated porous member. Longitudinally extending exhaust incoming and outgoing spaces are defined alternately between the adjacent filters by alternately closing the inlet and outlet ends of the spaces between the adjacent filters. Gas permeable reinforcing members are inserted in the exhaust outgoing spaces to prevent the filter from being deformed due to the difference between the pressure upstream and downstream of each filter produced when exhausts pass through the filters. Similar gas permeable reinforcing members may also be inserted in the exhaust incoming spaces or at both ends of the filter element to more positively prevent vibration of the filters.

13 Claims, 11 Drawing Sheets

PARTICULATE TRAP FOR DIESEL ENGINE

BACKGROUND OF THE INVENTION

The present invention relates to a particulate trap for trapping and removing particulates such as carbon contained in diesel engine exhausts.

Exhaust gases from automobiles are a major cause of air pollution. It is therefore of extreme importance to develop a technique for removing noxious components in exhausts.

In particular, it is most urgently required to develop a technique for removing particulate components in diesel engine emissions, which are mainly made up of NOx and carbon.

To remove such noxious components in exhausts, Unexamined Japanese Patent Publication 58-51235 proposes to provided an exhaust trap in an exhaust line to trap any noxious components and remove them by after-treatment. Other conventional exhaust purifying mean include various improvements in the engine itself such as exhaust gas recirculation (EGR) systems and improve fuel injection systems. But none of them can be a decisive solution. As of today, after-treatment methods are considered more practical as exhaust purifying means. Rigorous efforts are now being made to develop after-treatment type exhaust purifying systems.

It is required that particulate traps for trapping particulates contained in diesel engine emissions satisfy all of the following requirements.

1) Particulate Trapping Capability

A particulate trap has to be capable of trapping particulates with such high efficiency that exhausts are purified to a satisfactory degree. It is considered necessary to-trap an average of at least 60% of the particulates contained in diesel engine emissions, though the amount of particulates contained in exhausts depends upon the displacement of the diesel engine and the lead applied.

Airborne particulates 2 μm or less in diameter can enter human alveoli and reportedly trigger lung cancer. It is thus necessary that particulate traps be capable of efficiently trapping such small suspended particulates.

2) Pressure Drop

The particulate trap has to be capable of keeping the pressure drop in exhaust gases to a minimum. If it causes a large pressure drop, a back pressure will act on the engine, aggravating the fuel economy. Thus, it is necessary that the particulate trap have a small initial exhaust pressure drop (when no particulates are trapped). As it traps particulates, its filter tends to be clogged with the trapped particulates, so that the pressure drop will increase gradually. It is necessary to keep the pressure drop to a minimum even after it has trapped a large amount of particulates.

3) Regeneration

The third requirement is that the trap can be regenerated at low energy cost. This is because the particulate trap has to be regenerated or recycled many times for repeated use by burning trapped particulates. An electric heater or a light oil burner is considered as a feasible means for burning off particulates.

4) Durability

Fourthly, the trap has to be sufficiently durable. It has to be highly resistant to corrosion when exposed to hot exhaust gases and to heat shocks produced while burning particulates.

5) Integration with a catalytic converter

Further, it is necessary to provide a catalytic converter integral with the trap. In order to remove noxious gas components in exhausts, a catalytic converter carrying a noxious gas removing catalyst may be provided in an engine exhaust line. If it is desired to further provide a separate particulate trap in the same exhaust line, there may be no available mounting space in the exhaust line. Also, the cost for separately providing such two different kinds of after-treatment type exhaust purifying systems tends to be rather high.

One of the existing filter element materials that satisfy the above-listed requirement is a wall-flow type honeycomb porous member made of cordierite ceramics. It is considered the most practical.

But this filter has several problems. One problem is that particulates tend to collect locally. Another problem is that, because of low thermal conductivity of cordierite ceramic, this filter tends to develop heat spots during regeneration. As a result, the filter may melt or crack due to thermal stress. Such a filter is not durable enough. Unexamined Japanese Patent Publication 4-265411 proposes to uniformly heat a ceramic foam filter by optimally arranging regenerating heaters. But in this arrangement, the filter supporting portion is relatively small, so that its durability is not so high as a honeycomb porous filter when subjected to vibration or exhaust pressure. A ceramic fiber trap made by forming ceramic fibers into a candle shape is gaining much attention these days. But this trap is not sufficiently durable either, because the fibers forming the trap tend to be broken due to reduced strength when exposed to high-temperature exhaust gases.

Metal traps (as disclosed in Unexamined Japanese Patent Publications 6-257422, 6-294313, 7-731 and 7-51522) are now considered more promising, because they are high in thermal conductivity, less likely to develop heat spots and cracks and highly corrosion-resistant in high-temperature exhausts.

We will discuss problems of conventional metal traps in connection with the abovementioned requirements 1)—5).

Conventional metal traps basically satisfy requirements 1) and 3). But as to the capacity of trapping suspended particulates 2 μm or less in diameter in requirement 1), higher performance is desired.

As to requirement 2), conventional metal traps can cause a marked pressure drop after trapping particulates. If an especially low engine back pressure is required, these traps will be unsatisfactory. In order to minimize the pressure leas even after the filter element has trapped a large amount of particulates, the filter element has to have a large surface area (filtering area). But in order to increase the filtering area of a conventional metal trap filter element, it is necessary to use an extremely large trap.

In connection with requirement 4) is the filter element of a conventional metal trap is deformed microscopically due to the pressure of the introduced exhausts, and can be destroyed due to stress resulting from the microscopic deformation. Also, since the trap is mounted in the exhaust line, its filter element is vibrated together with the trap, which may result in the destruction of the filter element. These problems are observed in harsh endurance tests.

As to requirement 5), it is sometimes necessary to integrally provide a catalytic converter on a conventional metal trap. For example, a catalyst may be integrally carried on a wall-flow type, honeycomb porous member made of a cordierite ceramic, which was originally developed as a DPF. In such a case, it may be difficult to heat the catalyst to a temperature at which it act because the honeycomb porous member, having a large heat capacity, is slow to heat up.

An object of the present invention is to provide a particulate trap which is free of all the above problems and which satisfies all the requirements 1)–5).

SUMMARY OF THE INVENTION

According to the present invention, there is provided a particulate trap for use in a diesel engine including a filter element comprising a plurality of filters made of a three-dimensionally reticulated porous member comprising heat-resistant metal substrate having holes communicating with one another. The filters define alternating, longitudinally extending exhaust incoming spaces and exhaust outgoing spaces between the adjacent filters. The exhaust incoming spaces have their outlet ends closed, and the exhaust outgoing spaces have their inlet ends closed. The filter element is mounted in a container provided in an exhaust line of a diesel engine, and is characterized in that filter reinforcing members permeable to exhaust gases are provided in the exhaust outgoing spaces, at both ends of the filters, or both in the exhaust outgoing spaces and at both ends of the filters.

Such reinforcing members may be further provided in the exhaust incoming spaces.

The reinforcing members provided in the exhaust outgoing spaces and/or exhaust incoming spaces may occupy the entire area of the exhaust outgoing and/or incoming spaces. The reinforcing members provided at both ends of the filters may have protrusions and recesses that engage both ends of the filters.

The reinforcing members provided in the exhaust outgoing and/or incoming spaces may be used in combination with the reinforcing members provided at both ends of the filters.

The reinforcing members have to have larger pores than the filters. Also, they should be as light in weight and small in heat capacity as possible. Thus, they are preferably made of a heat-resistant metal having a material filling rate of 30% or less, in the form of a three-dimensionally reticulated porous member such as foam, wire gauze, metal fiber, unwoven fabric such as felt and so on corrugated sheet or punching metal.

As a head-resistant metal, it is preferable to select a metal that will not deteriorate when exposed to exhaust gases at 700° C. for 100 hours, such as a metal containing Fe, Ni or Co with Cr and/or Al added. Depending upon the kind of diesel engine or the conditions of use, higher heat resistance may be needed. Thus, it is preferable to use an Fe—Cr—Al or Ni—Cr—Al alloy, because these alloys will not deteriorate when exposed to exhaust gas at 800 ° C.

The filters may be made of a heat-resistant metal such as an Fe—Cr—Al or Ni—Cr—Al alloy. In order to keep the filter element from the influence of stress resulting from a difference in thermal expansion when burning particulates for regeneration, the reinforcing members and the filters should be made of the same kind of metal or of metals having similar thermal expansion coefficients. Fe—Cr—Al and Ni—Cr—Al alloys are preferable in this regard, too.

From another aspect of the invention, there is provided a particulate trap for use in a diesel engine including a filter element comprising a plurality of untapered cylindrical or tapered filters made of a three dimensionally reticulated porous member comprising a heat-resistant metal substrate having holes communicating with one another. The filters have different diameter from one another and are arranged concentrically to define alternating, longitudinally extending, concentric exhaust incoming spaces and exhaust outgoing spaces between the adjacent filters and inside the filter of the smallest diameter. The exhaust incoming spaces have their outlet ends closed and, the exhaust outgoing spaces have their inlet ends closed. The filter element is mounted in a container provided in an exhaust line of a diesel engine. The filters having larger diameters are thicker than the filters having smaller diameters.

Preferably, the thicker, outer cylindrical filters have larger pores.

In order to efficiently catch suspended particulates, alumina whiskers may be grown on the surface of the heat-resistant metal porous member substrate forming each filter of any of the above filter elements.

Catalysts may be carried on the filters of any of the abovementioned filter elements to provide a particulate trap having the function of a catalytic converter. The catalysts may be carried on one or both sides of the filters made of heat-resistant metal porous member, or may be carried on three-dimensionally reticulated porous members made of a heat-resistant metal provided on one or both sides of the porous member with continuous pores.

The particulate trap according to one aspect of the present invention has a filter element comprising a plurality of filters made of a three-dimensionally reticulated porous member comprising heat resistant metal substrate having holes communicating with one another. The filters define alternating, longitudinally extending exhaust incoming spaces and exhaust outgoing spaces between The adjacent filters. The exhaust incoming spaces have their outlet ends closed, and the exhaust outgoing spaces have their inlet ends closed. Simply by reducing the spaces between the flat filters, it is possible to considerably increase the filtering area without increasing the size of the trap. The filter reinforcing members inserted in the exhaust outgoing spaces or provided at both ends of the filters are permeable to exhausts and have a very low metal filling rate compared to the filter element. Additional pressure drop is thus kept to a minimum by the addition of the reinforcing members. Even if filters having small pore diameters are used to improve the particulate trapping efficiency, they will be less likely to clog because the filtering area is large. The pressure drop is thus kept to a minimum.

The reinforcing members prevent any small deformation of the filters due to the pressure of exhausts that pass through the particulate trap. Since the filters are not deformed, no stress will act thereon. The filter element is thus less likely to be destroyed, so that its durability improves. The filters are deformed due to a difference between the pressures upstream and downstream of each filter in such a way that the exhaust outgoing spaces bulge into a moderately curving shape, while the exhaust incoming spaces shrink correspondingly. Thus, by inserting reinforcing members in the exhaust outgoing spaces to fill the entire area of the exhaust outgoing spaces, it is possible to effectively prevent the deformation of filters.

By providing reinforcing members both in the exhaust incoming and outgoing spaces, they prevent deformation of the filters in the direction perpendicular to the filter surfaces due to vibration of the filters. Since the filters are not deformed, no stress will act thereon. The filter element is thus less likely to be destroyed, so that its durability improves. The filters are vibrated or deformed in a direction perpendicular to the filter surfaces so that the exhaust gas incoming and outgoing spaces will alternately bulge end shrink. Thus, by inserting the reinforcing members in the exhaust incoming and outgoing spaces so as to fill the entire area of the exhaust incoming and outgoing spaces, it is possible to effectively prevent the deformation of the filters.

By supporting the filter ends with the reinforcing members, the filters can be supported at both ends. The filters members are thus less likely to vibrate and thus less likely to suffer fatigue failure resulting from vibration. By using all of the abovementioned reinforcing members in combination, it is possible to suppress both vibration and deformation of the filters and thus to greatly improve the durability of the filter element.

By using reinforcing members low in material filling rate and having larger pores, it is possible to prevent excessive pressure drop due to the clogging of the reinforcing members and thus to prevent any bad influence on the particulate trapping properties. Also, by using reinforcing members having a low metal filling rate, it is possible to reduce the weight and heat capacity of the particular trap. Also, such reinforcing members will scarcely increase the energy for regeneration.

A stress applied to a thin cylindrical shell member due to external pressure is proportional to the radius of the cylindrical shell. Thus, the larger the radius of the cylindrical shell, the more it is likely to buckle (the stress that causes buckling of the cylindrical shell is proportional to the first to third power of its radius). In another aspect, the outer cylinders, which are subjected to a larger stress and likely to buckle at a lower pressure, are made of thicker filter materials. Thus, the stress applied to the outer, larger-diameter cylindrical filters decreases to substantially the same level as the stress applied to the inner, smaller-diameter filters, so that the former are less likely to buckle. The stress applied to a filter is inversely proportional to its thickness, while the stress that causes the buckling of the filter is inversely proportional to the first to third power of its thickness. Thus, by forming the outer filters from thicker filter materials, it is possible to minimize the difference in the stress applied and the resistance to buckling between the outer and inner filters. Thus, it is possible to reduce the possibilities of buckling of both the outer and inner filters to substantially equal degrees.

In an arrangement in which the thicker, outer filters have larger pores, it is possible to suppress the increase in pressure drop due to increased thicknesses of the outer filters. By determining the thickness of each filter corresponding to its radius, it is possible to adjust the filter thicknesses to optimum values with no too-thick filters present, so that the weight and heat capacity of the entire trap can be kept to a minimum. With this arrangement, the energy needed to burn trapped particulates is substantially the same as when burning particulates trapped by filters of the same thickness.

In an arrangement in which the pore diameter of the filter element decreases gradually from the exhaust inlet side to outlet side, it is possible to trap particulates uniformly over the entire thickness of each filter, so that the exhaust pressure is less likely to drop. The pressure difference life is thus prolonged.

In an arrangement wherein the spaces between the adjacent filters are 10 mm or less wide, it is possible to improve the particulate trapping efficiency without increasing the size of the trap, because the smaller the spaces between the filters, the larger the filtering surface area.

In an arrangement wherein a catalyst is carried on one or either side of each filter made of three-dimensionally reticulated porous member comprising heat-resistant metal substrate having holes communicating with one another, or in an arrangement in which a catalyst is carried on a three-dimensionally reticulated porous member in the form of a heat-resistant metal framework having continuous holes and provided on one or either side of the filter, the particulate trap acts as a catalytic converter as well. Since the catalysts are carried on metal substrates having a low metal filling rate and thus a low heat capacity, the catalysts can be heated quickly to the temperature at which the catalysts act.

By growing alumina whiskers on the surface of the filters made of three-dimensionally reticulated porous member, it is possible to sufficiently reduce pores in the filters. Such filters can trap suspended particulates with diameters of 2 μm and under.

If the surface on which the alumina whiskers are grown is used to carry a catalyst, such alumina whiskers will serve to increase the area of this surface.

By providing reinforcing members both in the exhaust incoming and outgoing spaces, they prevent the deformation of the filters in the direction perpendicular to the filter surfaces, due to vibration of the filters. Since the filters are not deformed, no stress will act thereon. The filter element is thus less likely to be destroyed, so that its durability improves. The filters are vibrated or deformed in a direction perpendicular to the filter surfaces so that the exhaust gas incoming and outgoing spaces will alternately bulge and shrink. Thus, by inserting the reinforcing members in the exhaust incoming and outgoing spaces so as to fill the entire area thereof the filters are less likely to be destroyed.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENT

FIGS. 4–7 show embodiments of a filter element for use in a particulate trap of the present invention. These filter elements are the same as filter elements 1, 11 and 21 shown in FIGS. 1–3 except that reinforcing members are added.

Figure 1A:
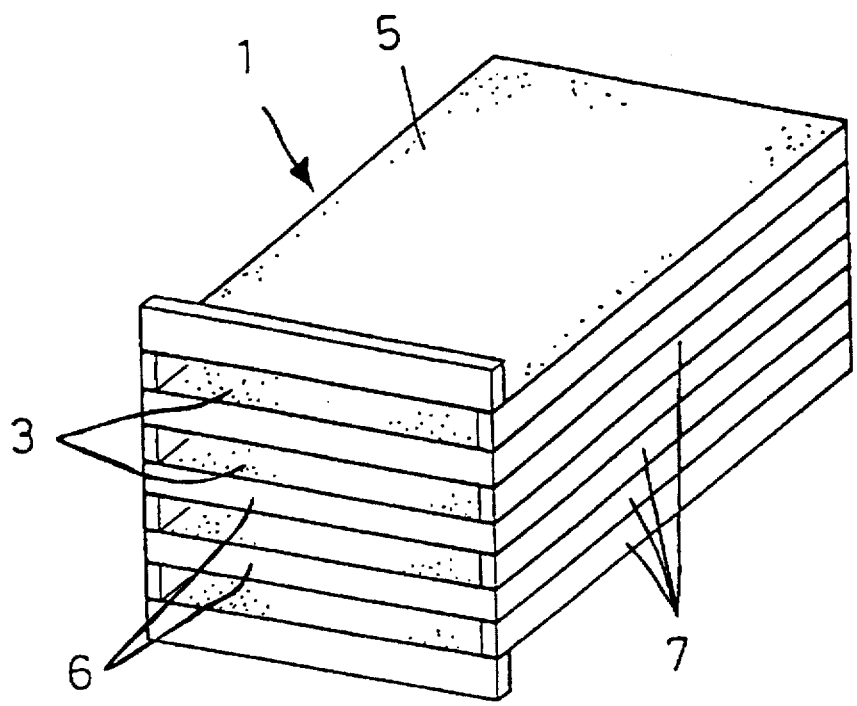
FIG. 1A is a perspective view of a filter element on which an improvement according to the present invention is to be made.
Figure 1B:
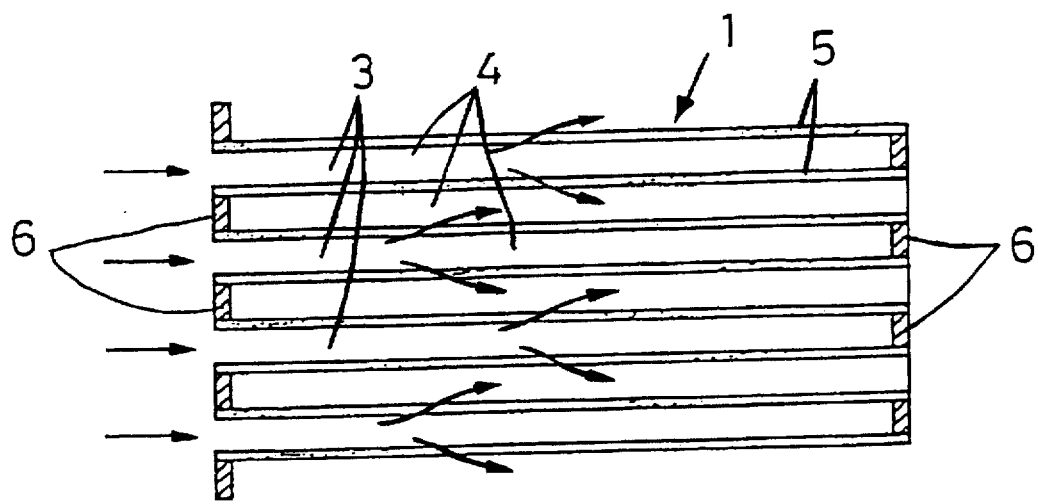
FIG. 1B is a vertical sectional view of the same.

The filter element 1 shown in FIG. 1 comprises a plurality of flat filters 5 arranged in parallel, end plates 6 alternately closing the inlet and outlet ends of the spaces between the adjacent filters 5, and liners 7 (which may be integral with the end plates 6) closing both sides of the spaces. The filters 5, end plates 6 and liners 7 define, in cooperation, alternating exhaust incoming spaces 3 and exhaust outgoing spaces 4.

Figure 2A:
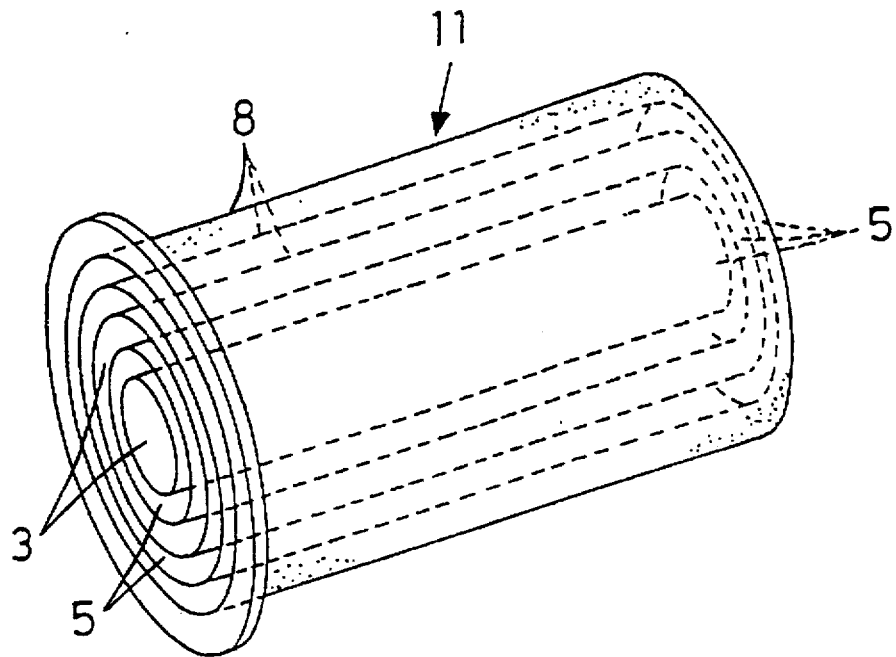
FIG. 2A is a perspective view of another filter element on which the improvement according to the present invention is to be made.
Figure 2B:
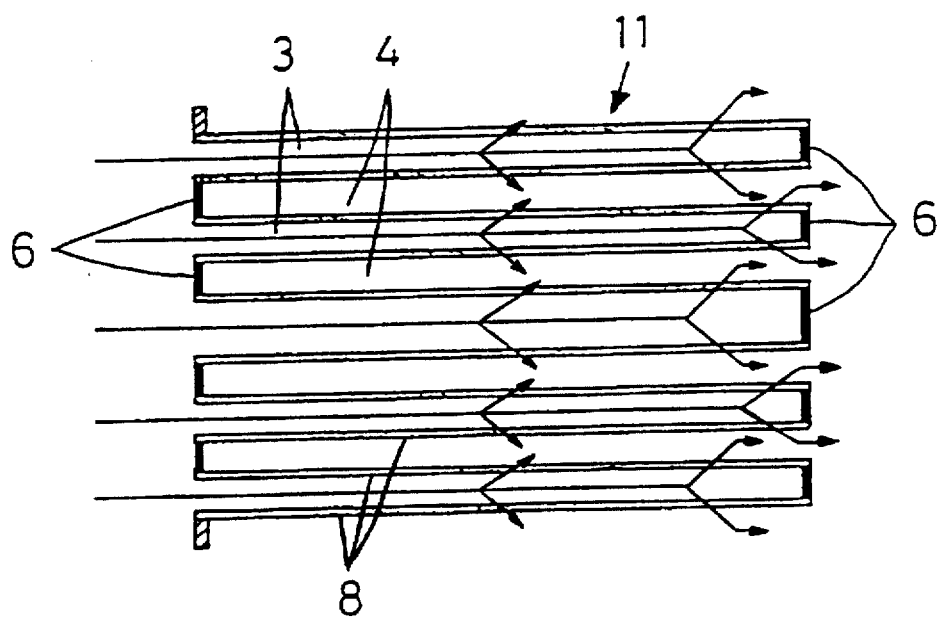
FIG. 2B is a vertical sectional view of the same.

The filter element 11 shown in FIG. 2 comprises a plurality of untapered column-shaped (cylindrical in the example shown) filters 8 analogous in section with different diameters and arranged concentrically with each other, and end plates 6 alternately closing the inlet and outlet ends of the space between the adjacent filters, thereby defining the alternating exhaust incoming spaces 3 and exhaust outgoing spaces 4.

Figure 3A:
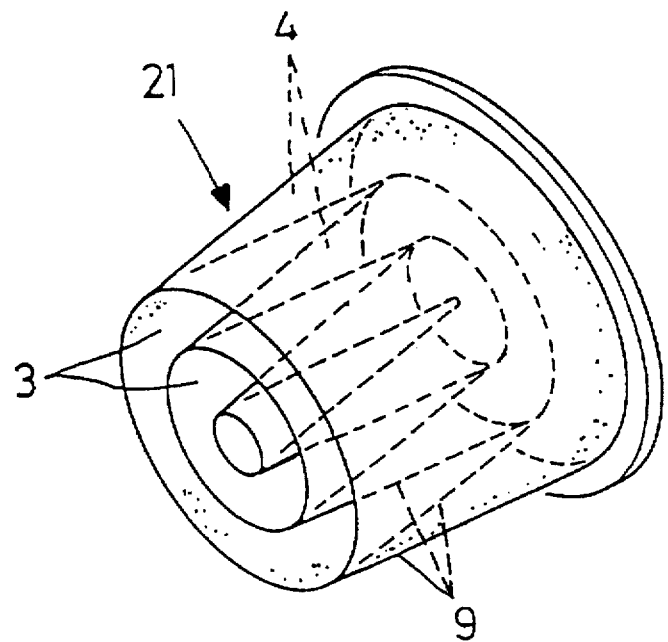
FIG. 3A is a perspective view of still another filter element on which the improvement according to the present invention is to be made.
Figure 3B:
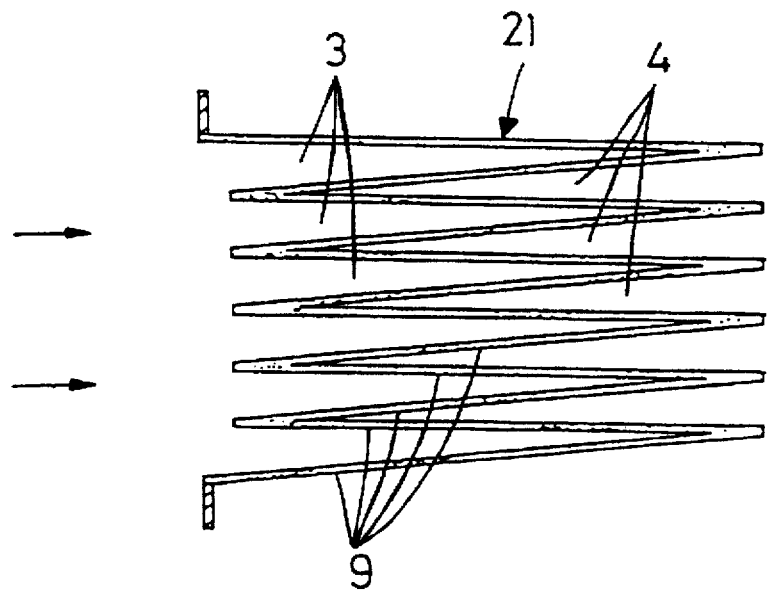
FIG. 3B is a vertical sectional view of the same.

The filter element 21 shown in FIG. 3 comprises a plurality of tapered column-shaped (conical in the example shown) filters 9 having different diameters from one another and arranged concentrically, with adjacent ones directed in opposite directions to each other so that the adjacent filters are connected together at their respective one and the other ends. The filter element has a zigzag section as a whole, as shown in FIG. 3B, with the alternating exhaust inlet spaces 3 and exhaust outlet spaces 4 defined between the adjacent filters 9.

The filters of each of the filter elements 1, 11 and 12 are made of three-dimensionally reticulated porous members comprising a heat-resistant metal substrate having holes communicating with one another. To reduce the size of the entire trap add to efficiently regenerate the filters, the width of the spaces 3, 4 between the adjacent filters is preferably 10 mm or less.

Figure 4:
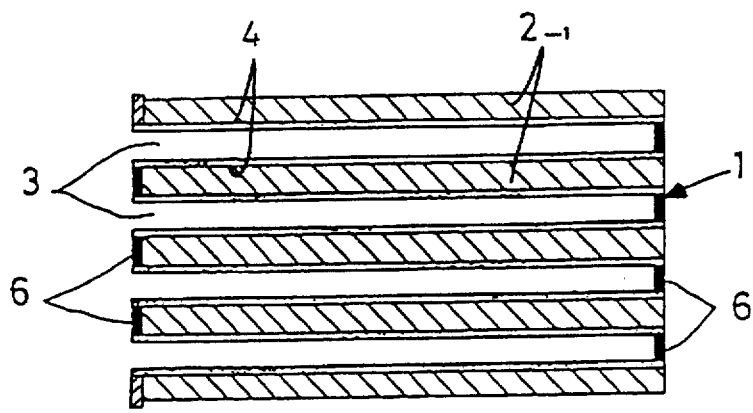
FIG. 4 is a sectional view of an embodiment of filter element for a particulate trap according to the present invention.

The filter element of the embodiment shown in FIG. 4 may be any of the filter elements 1, 11 and 21 (though only the filter element 1 is shown in FIG. 1). It has air permeable reinforcing members 2-1 inserted in the exhaust outgoing spaces 4 to support the filters opposite to each other on both sides of each space 4.

Figure 5:
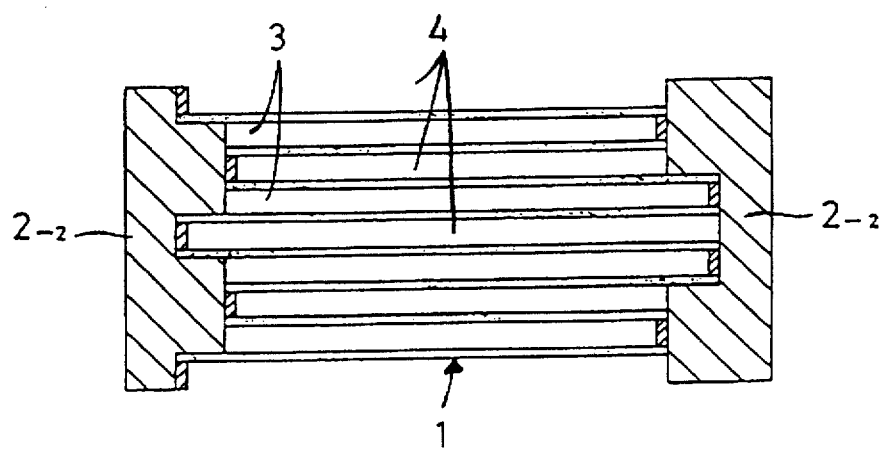
FIG. 5–9 are sectional views of other embodiments.

The filter element shown in FIG. 5 has reinforcing members 2—2 at both ends thereof. They have protrusions and recesses that engage both ends of the filters.

Figure 6:
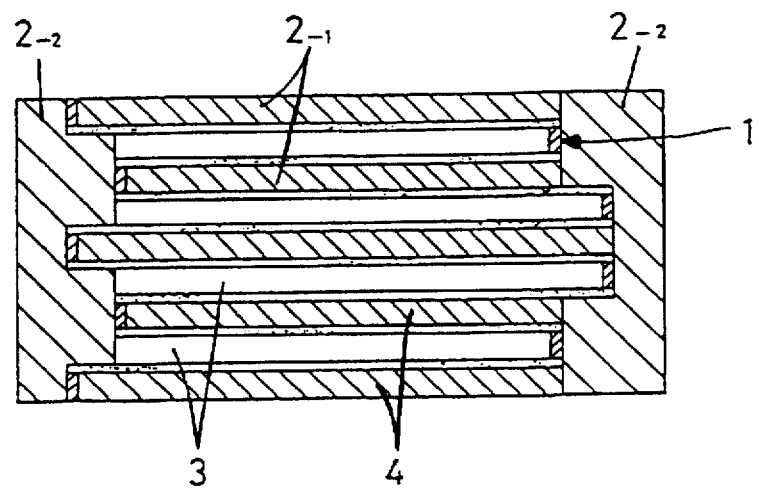

The falter element shown in FIG. 6 has both the reinforcing members 2-1 and 2—2 shown in FIGS. 4 end 5.

Figure 7:
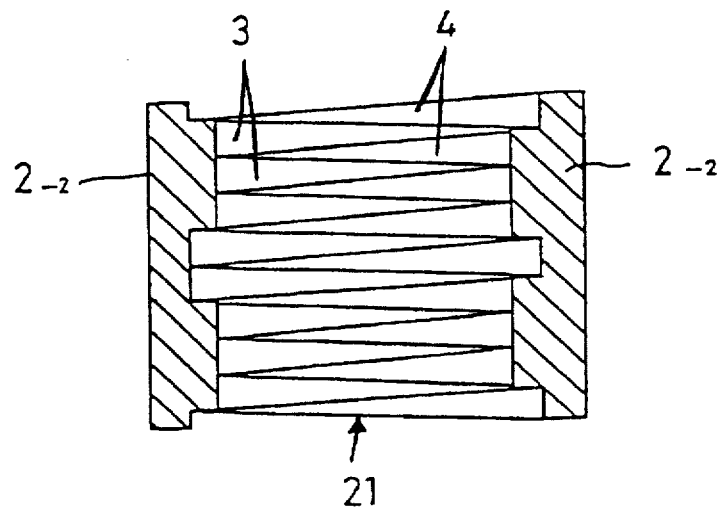

The filter element shown in FIG. 7 has the same filters as those shown in FIG. 3, or has filters formed by bending flat filters in a zigzag manner so that they have the same section as the filters shown in FIG. 3B. Both sides of the spaces between filters are closed by liners. Reinforcing members 2—2 are provided at both ends of the filter element.

The filter elements shown in FIGS. 5, 6 and 7 have their filters in engagement with the recesses and protrusions of the reinforcing members 2—2 by arranging the dead ends of the spaces 3 and 4 in a staggered manner. But by using reinforcing members 2—2 having a suitable shape, it is possible to stably support the filters by bringing the filters into engagement with the protrusions and recesses of the reinforcing members without the need to stagger the dead ends of the spaces 3 and 4.

Figure 8:
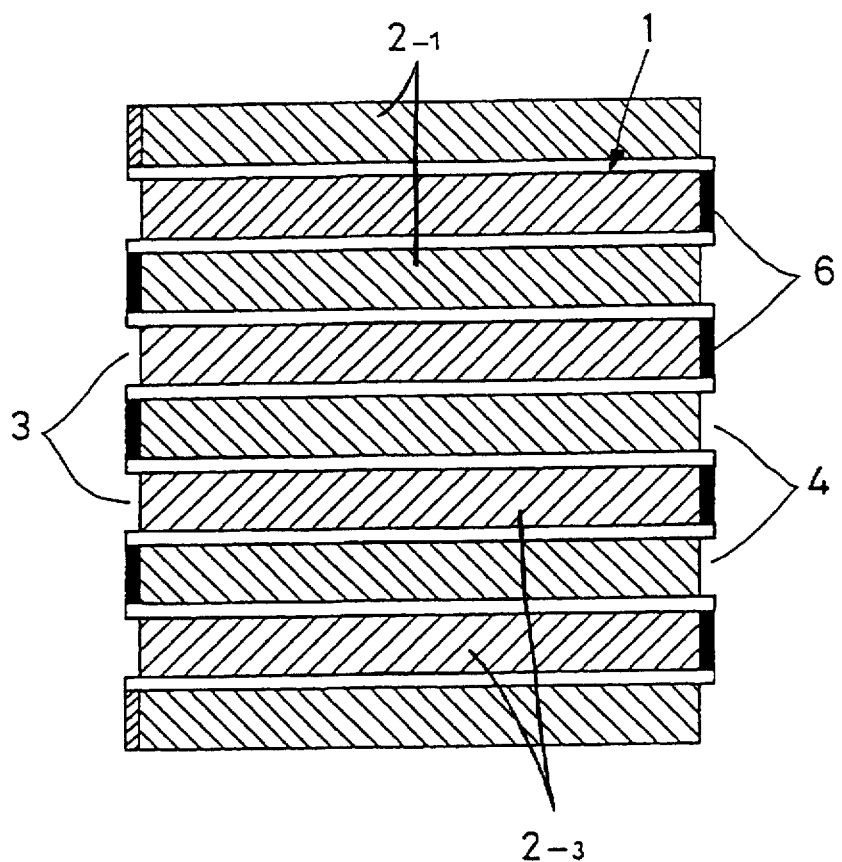
Figure 9:
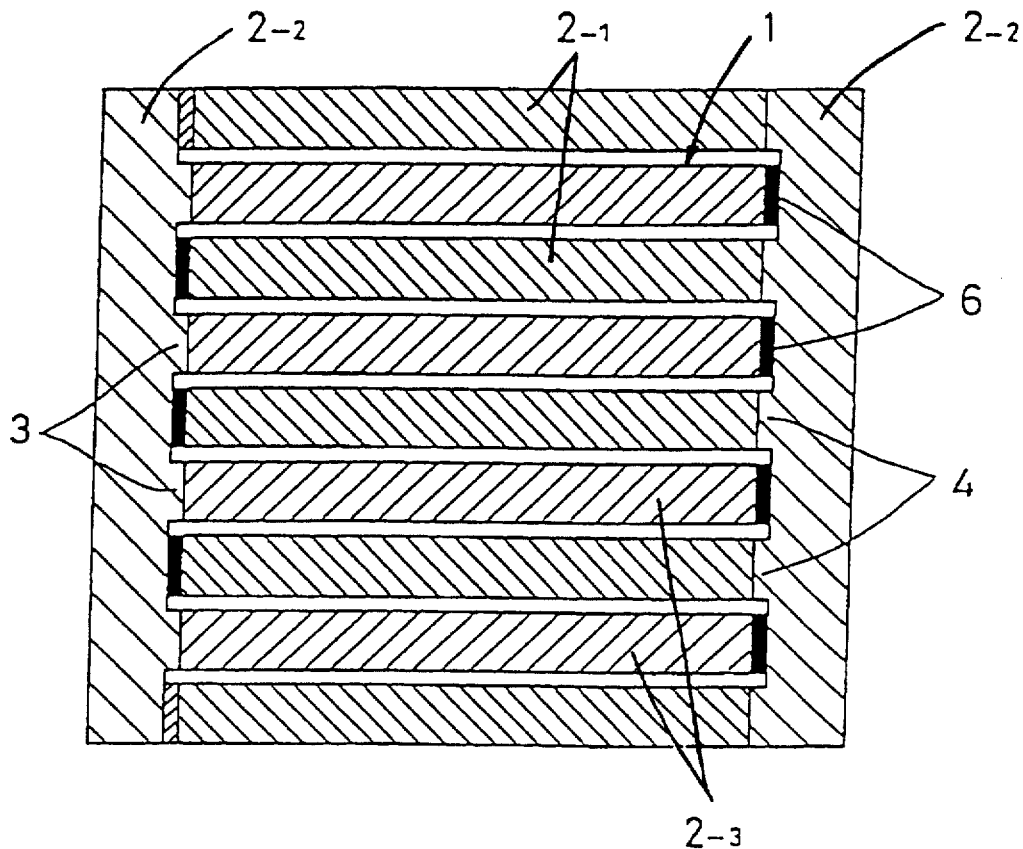

The filter element of the embodiment shown in FIG. 8 may be any of the filter elements 1, 11 and 21 (though only the filter element 1 is shown). It has air permeable reinforcing members 2-1 and 2-3 inserted in the exhaust incoming spaces 3 and exhaust outgoing spaces 4, respectively to support the filter element. The filter element shown in FIG. 9 is the same as the filter element shown in FIG. 8 with the reinforcing members 2—2 further added thereto.

The reinforcing members 2-1 and 2—2 should be formed from a metal that will not deteriorate even when exposed to 700° C. exhaust gases for 100 hours. Such metals include Fe—Cr—Al alloy and Ni—Cr—Al alloy, which are also used as filter materials. Considering the pressure difference produced between upstream and downstream side of the filters, the reinforcing members should have a strength sufficient to withstand the pressure of 0.3 kg/cm$^2$ at 700° C. For this purpose, the metal filling rate cannot be reduced below a certain point, though this point depends on the kind of the metal used. The reinforcing members may be formed from a three-dimensionally reticulated porous member having a packing density of 30% or less, wire gauze, unwoven metal fabric, punching metal or corrugated sheet. If a corrugated sheet is used, the volume of a rectangular space in which the sheet fits tightly is regarded as the volume of the sheet.

The reinforcing members 2-3 are also formed from a three-dimensionally reticulated porous member having a packing density of 30% or less, wire gauze, unwoven metal fabric, punching metal or corrugated sheet having a filling rate not exceeding 30%. If a corrugated sheet is used, the volume of a rectangular space in which the sheet fits tightly is regarded as the volume of the sheet.

Figure 10:
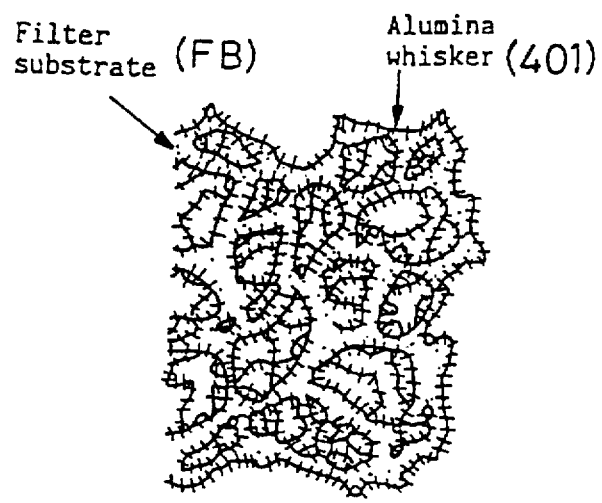
FIG. 10 is a schematic view showing alumina whiskers grown on a filter framework.

As shown in FIG. 10, the filters may be made of three-dimensionally reticulated porous member (FB) with numerous fine alumina whiskers 401 added thereto to form multiplicity of minute pores.

Figure 11:
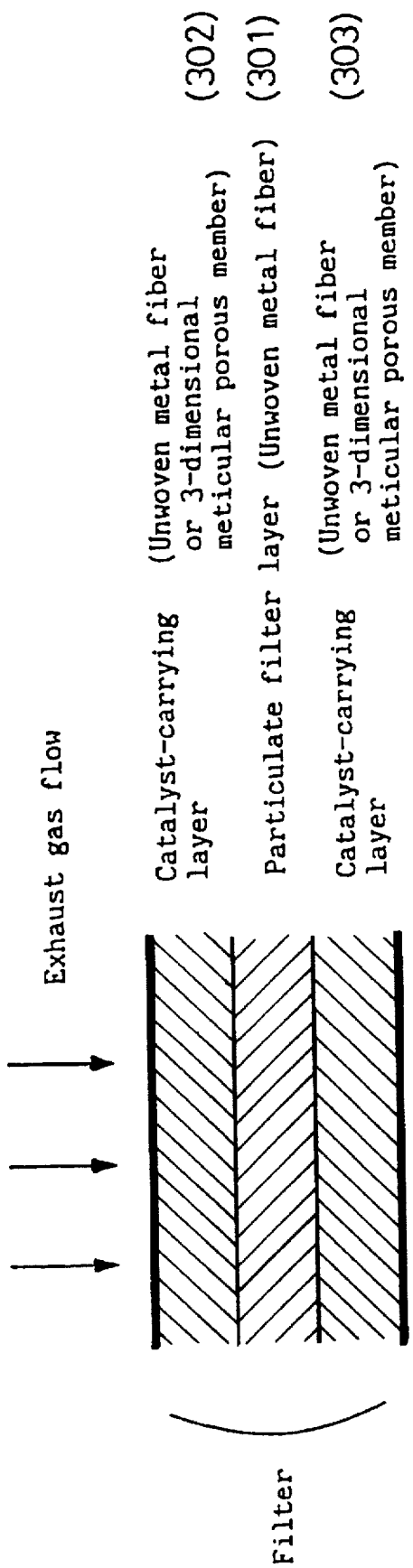
FIG. 11 is a enlarged view of a filter section.

FIG. 11 is an enlarged sectional view of the filters 1, 11 21. They may comprise a particulate trapping layer 301 made of a filter material, and a plurality of catalyst-carrying layers (such as layers 302 and 303).

The embodiments are described in more detail.

Figure 12:
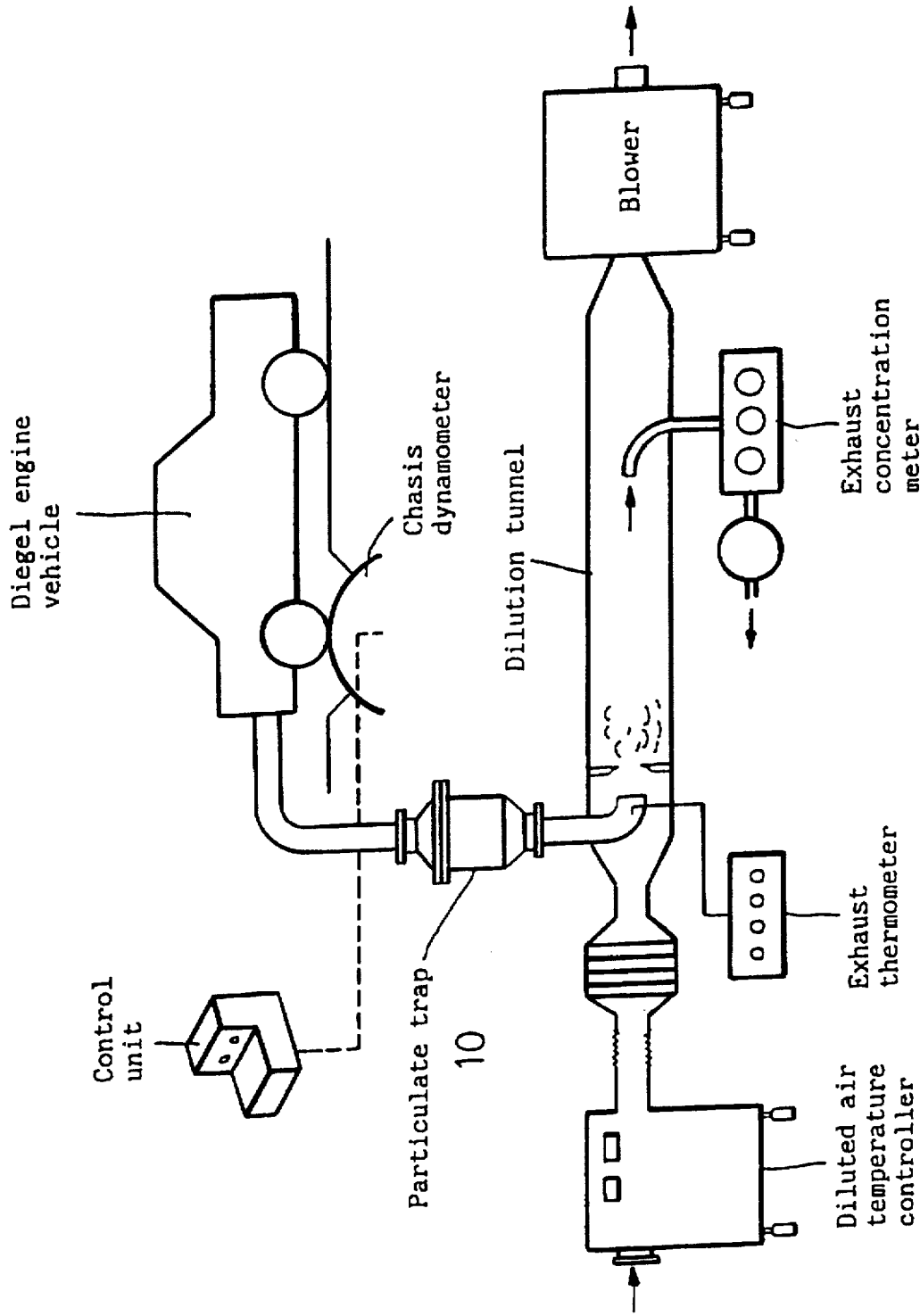
FIG. 12 is a schematic view of a property evaluation experiment device.

FIG. 12 shows an experiment device for evaluating the particulate trapping efficiency, the pressure drop when trapping particulates and the durability. The device comprises a 3400-cc, four-cylinder, direct-injection diesel engine car, a chassis dynamometer, and a dilution tunnel.

This device shown in FIG. 12 was also used to evaluate the purifying rates for NO and SOF, which we will describe later.

EXPERIMENT 1

The following three kinds of specimens were prepared.
- A: filter element of FIG. 4 having the reinforcing members 2-1 inserted in the exhaust incoming spaces 4 of the filter element of FIG. 1 (Example of the invention)
- B: filter element of FIG. 1 without reinforcing members (Comparative Example)
- I: honeycomb falter element considered to have a sufficient particulate trapping capacity (made of cordierite, NIHON GAISHI, PHC-221) (Comparative Example).

Table 1 shows more detailed data on these specimens. Specimen I has a volume of 2.5 liters, which is the same as Specimens A and B.

9

The reinforcing members used in Specimen A are formed by Ni—Cr—Al-alloying an Ni-based, three-dimensionally reticulated porous material (trade name: cermet #1) made by Sumitomo Electric Industries, Ltd.

Particulate traps 10 formed by placing these specimens in cases are mounted in the device shown in FIG. 12 to check how the filter elements were destroyed when high-temperature exhausts are passed for a long time. The results are shown in Table 3.

Specimens A and I were not destroyed. Specimen B was destroyed.

Next, we evaluated their durability during regeneration. After 15 g of particulates in diesel engine exhausts have been trapped, electric heaters provided so as to face all of the particulate trapping surfaces of the filters were tuned on to burn the trapped particulates, while keeping the engine idling so that exhaust gases at 600° C. are introduced into the trap. This regeneration test was conducted five times for each specimen, and then they were checked as to how they were destroyed. The results are shown in Table 4.

Specimens A and B were not destroyed, and Specimen I suffered cracks. We also evaluated the particulate trapping capacity, and trapping properties such as increase in the pressure difference (pressure drop) after particulates are trapped. But no significant difference in these properties was observed among these three specimens.

From these experiment results, it is apparent that only the Embodiment A of the invention attained satisfactory results in all of the particulate trapping properties, durability and regeneration properties.

EXPERIMENT 2

The following Specimens C and D, add the Specimen T used in Experiment 1 were prepared.

C: filter element similar to the filter element of FIG. 1 (the positions of the dead ends of the spaces ere partially varied) with the reinforcing members 2-1 inserted in the exhaust gas outgoing spaces 4 and the reinforcing members 2—2 provided at both ends so that it has the same sectional shape as shown in FIG. 6 (Example of the invention)

D: filter element which is the same as Specimen C except that it has no reinforcing members (Comparative Example)

Table 5 shows detailed data on these specimens. Table 6 shows the detailed data on the reinforcing members 2-1 and 2—2 used in Specimen C.

Table 7 shows the results of an endurance test conducted for oach specimen in the same manner as in EXPERIMENT 1.

Particulates trapped were burned for regeneration under the same conditions as in EXPERIMENT 1 to evaluate the durability of each specimen during regeneration. The results are shown in Table 8.

As will be apparent from Tables 7 and 8, Specimen D was poor in durability, while Specimen I was poor in the results of the regeneration test. In contrast, the specimen according to the invention (Specimen C) was superior both in durability and regeneration properties. As for the particulate trapping properties, all of the specimens achieved good results. No significant difference was observed among the specimens.

EXPERIMENT 3

The following Specimens E and F and the abovementioned Specimen I were prepared.

E: filter element comprising, similar to the filter element of FIG. 2, concentrically arranged cylindrical filters having different diameters, with the reinforcing members 2-1 inserted in the exhaust gas outgoing spaces 4 and the reinforcing members 2—2 provided at both ends, so that the filter element has the same sectional shape as shown in FIG. 6 (Example of the Invention)

F: filter element which is the same as Specimen E except that it has no reinforcing members (Comparative Example)

Table 9 shows detailed data on these specimens. Table 10 shows the detailed data on the reinforcing members 2-1 and 2—2 used in Specimen E.

Each specimen was subjected to the same endurance test and regeneration test as in EXPERIMENT 1. The test results are shown in Tables 11 and 12. As for the particulate trapping properties, no significant difference was observed among the three specimens.

The test results are exactly the same as the results in Embodiments 1 and 2. That is, only the example of the invention, i.e. Specimen E, achieved good results in all of the particulate trapping properties, durability and regenerating properties.

EXPERIMENT 4

The following Specimens G and H and the abovementioned Specimen I were prepared.

G: filter element shown in FIG. 3 with the reinforcing members 2—2 provided at both ends so that it has the sectional shape shown in FIG. 7 (Example of the invention)

H: filter element of FIG. 3 but with no reinforcing members (Comparative Example)

Tables 13 and 14 show more detailed data on these specimens and the reinforcing members 2—2 used in Specimen G.

Each specimen was subjected to the same endurance test and regeneration test as in EXPERIMENT 1. The test results are shown in Tables 15 and 16.

The test results are exactly the same as the results in EXPERIMENT 1, 2 and 3. As for the particulate trapping properties, no significant difference was observed among the specimens.

As will be apparent from the above EXPERIMENTS, the concept of the present invention is applicable to any of the filter elements shown in FIGS. 1, 2 and 3.

Figure 13A:
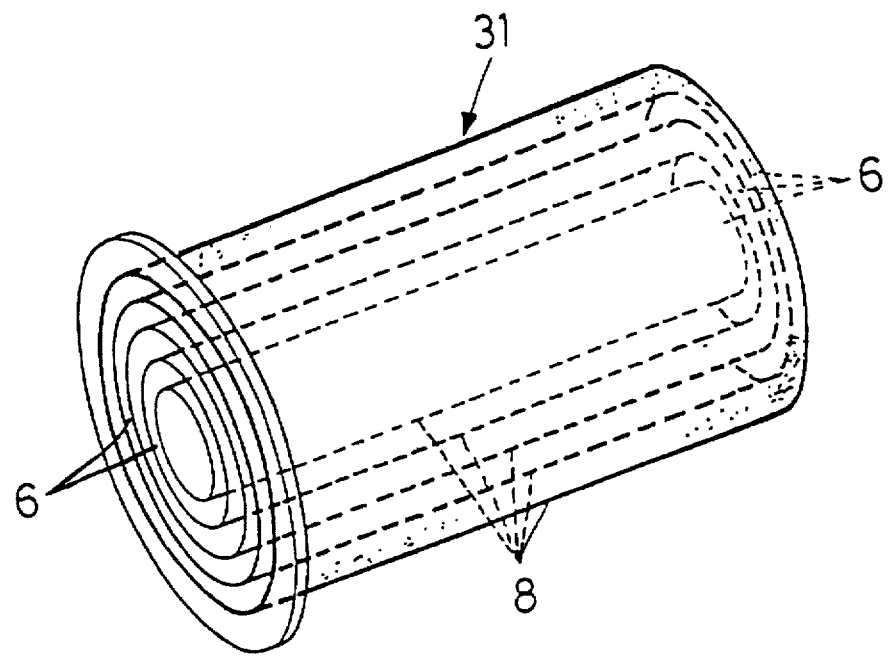
FIG. 13A is a schematic view of an embodiment of a filter element according to a further aspect of the present invention.
Figure 13B:
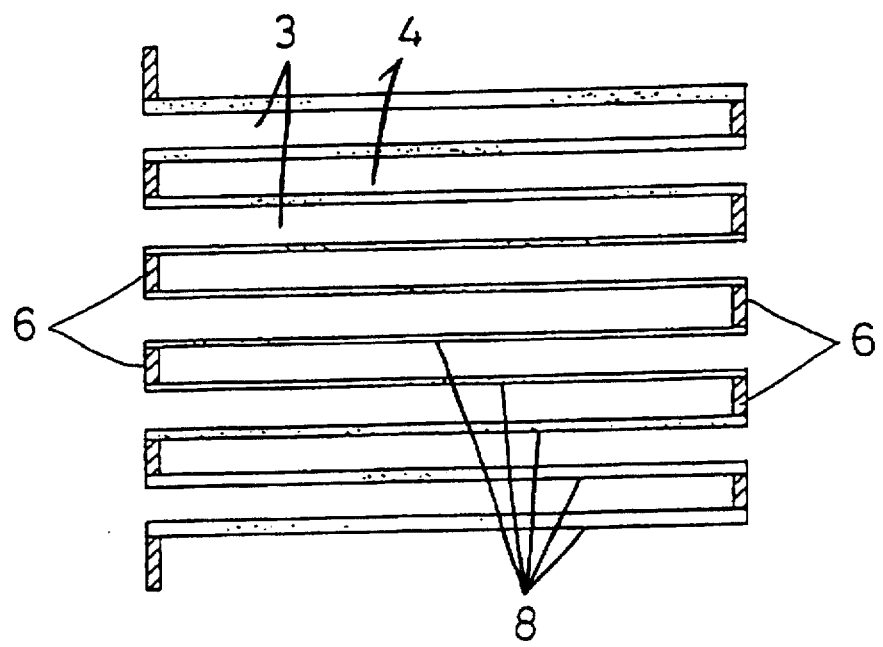
FIG. 13B is a sectional view of the element of FIG. 14A.
Figure 14A:
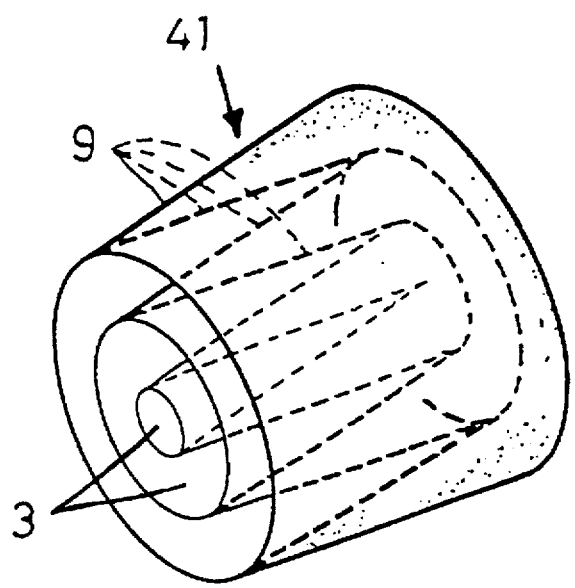
FIG. 14A is a schematic view of another embodiment of the filter element claimed in claim 7.
Figure 14B:
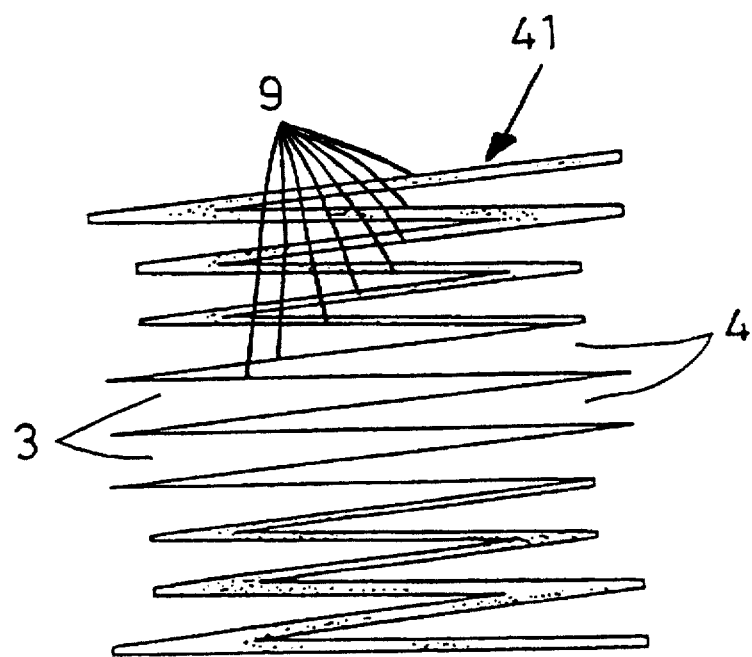
FIG. 14B is its sectional view.

FIGS. 13 and 14 show specific embodiments of the filter element for use in the particulate trap claimed in claim 7.

The filter element 31 shown in FIG. 13 is an improved version of the filter element shown in FIG. 2. The filter element 41 shown in FIG.14 is an improvement of the filter element shown in FIG. 3.

These filter elements 31 and 41 comprise a plurality of groups of concentrically arranged cylindrical filters 8, 9, each group comprising several adjacent filters having the same thickness which is larger than the thicknesses of the smaller-diameter filters of the inner filter group. But it is more preferable that each cylindrical filter has a larger thickness then the inner, smaller-diameter filters.

As the material for the filter there are used three-dimensionally reticulated porous members comprising heat-resistant metal substrates having holes communicating with one another (e.g. Cermet described later), or the porous member with their holes partially filled with ceramics or metal to reduce the effective hole diameter.

We will describe embodiments of the filter elements shown in FIGS. 13 and 14 in more detail.

EXPERIMENT 5

The following three kinds of specimens were prepared.

J: filter elements comprising 11 cylindrical filters having different diameters and arranged concentrically with one another as shown in FIG. 13, the filters having thicknesses increasing outwardly in five stages (Example of the invention)

K: filter element comprising 11 concentrically arranged cylindrical filters having different diameters and the same thickness (Comparative Example)

I: honeycomb filter element considered to have a sufficient particulate trapping capacity (made of cordierite, by NIHON GAISHI, PHC-221) (Comparative Example).

Table 17 shows detailed data on these specimens. Specimen I had a volume of 2.5 liters, which is the same volume as Specimens J and K. As the filter material J and K, Ni—Cr—Al alloyed Ni-based, three-dimensionally reticulated porous material (trade name: Cermet) made by Sumitomo Electric Industries, Ltd. was used.

Figure 15:
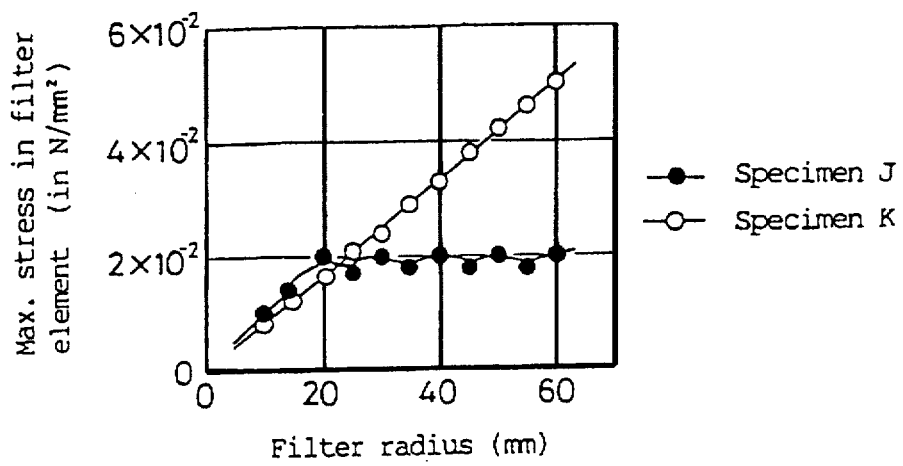
FIG. 15 is a graph showing the relationship between the maximum stress and the filter radius for Specimens J and K.

For filter element specimens J and K, we determined by calculation the exhaust gas pressures that caused buckling of these filter elements. The results are shown in Table 18. FIG. 15 shows the relationship between the maximum stress applied to the cylindrical filter of each of Specimens J and K due to the initial exhaust pressure and the filter diameter.

For Specimen K, the stress increased in proportion to the filter diameter. For Specimen J, the maximum stresses applied to the outer, thicker filters were suppressed. They are considered to have larger resistance to buckling.

Particulate traps 10 formed by placing these specimens J, K and I in cases are mounted in the exhaust line of the device shown in FIG. 12 to check how the filter elements were destroyed when high-temperature exhausts were passed for a long time. The results are shown in Table 19.

Specimens J and I were not destroyed. Specimen K was destroyed.

Next, we evaluated their durability during regeneration. After 15 g of particulates in diesel engine exhausts have been trapped, electric heaters provided so as to face all of the particulate trapping surfaces of the filters were tuned on to burn the trapped particulates, while keeping the engine idling to introduce exhaust gases at 600° C. into the trap. This regeneration test was conducted five times for each specimen, and then they were checked how they were destroyed. The results are shown in Table 20.

Specimens J and K were not destroyed, but Specimen I suffered cracks. We also evaluated the particulate trapping capacity, and trapping properties such as increase in the pressure difference (pressure drop) due to trapping of particulates. But no significant difference in these properties was observed among these three specimens.

The results of the experiments show that the specimen J (according to the present invention) meets the requirements in trapping capacity, endurance and regenerating capability whereas the comparative examples K and I do not.

EXPERIMENT 6

The following Specimens L and M and the same Specimen I used in EXPERIMENT 5 were prepared.

L: filter element comprising eleven tapered cylindrical filters having different diameters and arranged alternately in opposite directions to each other as shown in FIG. 14, the filters having thicknesses increasing outwardly in three steps (Example of the invention)

M: filter element comprising eleven tapered cylindrical filters arranged in similar manner to Specimen L and having different diameters and the same thickness (Comparative Example)

Table 21 shows more detailed data on each specimen.

Figure 16:
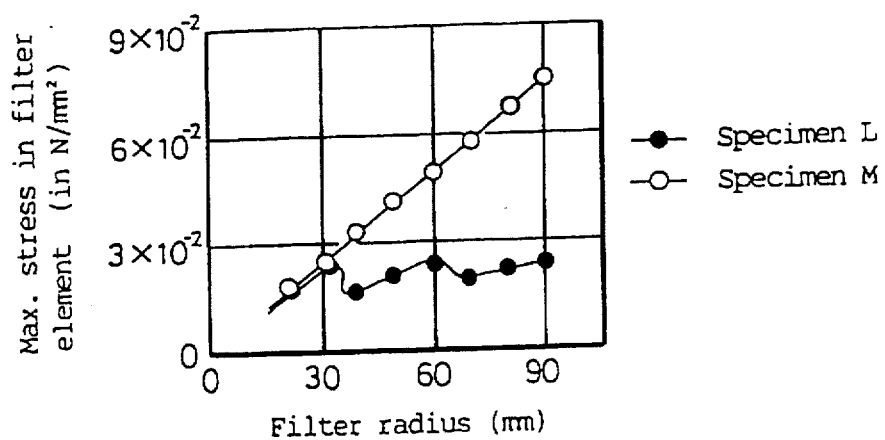
FIG. 16 is a graph showing the relationship between the maximum stress and the filter radius for Specimens L and M.

Table 22 shows the pressures at which Specimens L and M buckled. FIG. 16 shows the relationship between the maximum stress applied to each filter of the specimen due to the initial exhaust pressure and the filter diameter. Tables 23 and 24, respectively, show the results of an endurance test conducted in the same manner as in EXPERIMENT 5, and an endurance test during regeneration conducted in the same manner as in EXPERIMENT 5, for Specimens L, M and I.

The test results are the same as in EXPERIMENT 5. For particulate trapping properties, no significant difference was observed among the specimens.

EXPERIMENT 7

The following specimens N and O and the abovementioned specimen I were prepared.

N: filter elements comprising 8 cylindrical filters having different diameters and arranged concentrically with one another as shown in FIG. 13, the filters having thickness increasing outwardly in two stages (Example of the invention)

O: filter element comprising 8 cylindrical filters having different diameters and arranged in the same manner as specimen N, but the filters having the same thickness (Comparative Example)

Figure 17:
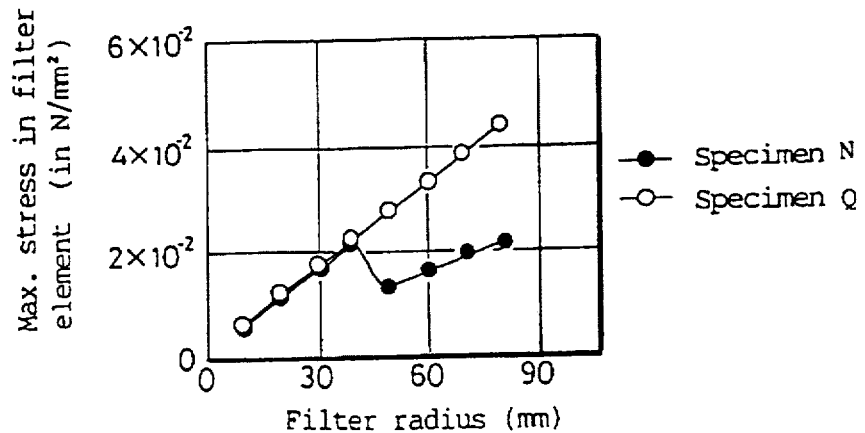
FIG. 17 is a graph showing the relationship between the maximum stress and the filter radius for specimens N and O.

For specimens N and O, we determined by calculation the exhaust gas pressures that caused buckling of these filter elements. The results are shown in Table 26. FIG. 17 shows the relationship between the maximum stress applied to the cylindrical filter of each of Specimens due to the initial exhaust pressure and the filter diameter.

Table 27 and 28 show the results of the endurance test and the regeneration tests conducted in the same conditions as EXPERIMENT 5, respectively.

The results were the same as in EXPERIMENT 5.

The test results show that increasing the filter thickness outwardly is effective in increasing the resistance to exhaust gas pressure.

EXPERIMENT 8

The following four kinds of specimens were prepared.

P, Q: filter elements as shown FIG. 1 with the reinforcing members 2-1 inserted in the exhaust gas incoming spaces 4 as shown in FIG. 4 (Example of the invention)

R: filter element as shown in FIG. 1 without reinforcing members (Comparative Example)

I: honeycomb filter element considered to have a sufficient particulate trapping capacity (made of cordierite, by NIHON GAISHI, PHC-221) (Comparative Example).

Table 29 shows detailed data on these specimens. Specimen I has a volume of 2.5 liters, i.e. the same volume as Specimens P, Q and K.

The reinforcing members used in Specimens P and O are formed by Ni—Cr—Al-alloying an Ni-based, three-dimensionally reticulated porous material (trade name: cermet #1) made by Sumitomo Electric industries, Ltd.

The filter element 1 of Specimen P comprises a NOx catalyst-carrying layer (302 in FIG. 11), a particulate trapping layer (301 in FIG. 11), and a NOx catalyst-carrying layer (303 in FIG. 11). Each NOx catalyst layer comprises a substrate of Ni—Cr—Al three-dimensionally reticulated porous member, a catalyst-carrying γ-alumina coating provided on the substrate at the rate of 100 grams per liter of the porous member, and Cu as a catalyst uniformly carried on the γ-alumina coating at the rate of 1.0 gram per liter of porous member.

The reinforcing members (2-1 in FIG. 4) of Specimen O has a NOx catalyst-carrying γ-alumina coating on the cermet substrate at the rate of 100 grams per liter of cermet, and Cu as a catalyst uniformly carried on the γ-alumina coating at the rate of 1.0 gram/liter.

Each specimen was subjected to the same endurance test and regeneration test as in EXPERIMENT 1. The test results are shown in Tables 31 and 32. There was no difference in the particulate trapping properties among the specimens.

Specimens P and O achieved satisfactory results in all of the particulate trapping properties, durability and regenerating properties.

For Specimens P and Q, we evaluated their NO purifying rates.

In this test, $C_2H_4$ was introduced into exhausts as a reducing agent. The contents of the exhausts are shown in Table 33.

For each specimen, the NO concentration was measured for two minutes while keeping the exhaust temperature at 250° C. Table 34 shows the average NO concentration.

From these tables, it is apparent that the NO concentration decreased to half by passing exhausts through Specimen P or Q.

From these experiment results, it is apparent that only the Specimens P and Q according to the present invention can achieve satisfactory results in all of the particulate trapping properties, durability and regenerating properties. Moreover, these specimens can reduce the NO content in exhausts, so that there is no need to provide a catalytic converter. Thus, by using the particulate trap according to the present invention, it is possible to reduce the installation space and the manufacturing cost of the diesel exhaust after-treatment device.

EXPERIMENT 9

The following four kinds of specimens were prepared. S, T: filter elements comprising, similar to the filter element of FIG. 2, concentrically arranged cylindrical filters having different diameters, with the reinforcing members 2-1 inserted in the exhaust gas outgoing spaces 4 and the reinforcing members 2—2 provided et both ends, so that the filter element has the same sectional shape shown in FIG. 6 (Example of the invention)

U: filter element which is the same as Specimen S and T except that it has no reinforcing members (Comparative Example)

I: honeycomb filter element considered to have a sufficient particulate trapping capacity (made of cordierite, by NIHON GAISHI, PHC-221) (Comparative Example).

Table 35 shows detailed data on these specimens. Table 36 shows the details for the reinforcing members 2-1, 2—2 used for Specimens S and T. Specimen I has a volume of 2.5 liters, i.e. the same volume as Specimens S, T and U.

The filter element 11 of Specimen S comprises an SOF catalyst-carrying layer (302 in FIG. 11), a particulate trapping layer (301 in FIG. 11), and another SOF catalyst-carrying layer (303 in FIG. 11). Each SOF catalyst layer comprises a substrate of Ni—Cr—Al three-dimensionally reticulated porous member, a catalyst-carrying γ-alumina coating provided on the substrate at the rate of 150 grams per liter of porous member, and Pt as a catalyst uniformly carried on the γ-alumina coating at the rate of 1.5 grams per liter of the porous member.

The reinforcing members (2-1 in FIG. 6) of Specimen T has an SOF catalyst-carrying γ-alumina coating on the cermet substrate at the rate of 150 grams per liter of cermet, and Pt as a catalyst uniformly carried on the γ-alumina coating at the rate of 1.5 grams/liter.

Each specimen was subjected to the same endurance test and regeneration test as in EXPERIMENT 1. The test results are shown in Tables 37 and 38. There was no difference in the particulate trapping properties among the three specimens.

Specimens S and T according to the invention on achieved satisfactory results in all of the particulate trapping properties, durability and regenerating properties.

For Specimens S and T, we evaluated their SOF purifying rates.

This test was conducted while keeping the exhaust gas temperature at 250° C. and 350° C. The test results are shown in Table 39.

By passing exhausts through Specimens S and T carrying Pt as a catalyst, the SOF concentration decreased by 40% or 50%.

From these experimental results, it is apparent that only the Specimens S and T according to the present invention can achieve satisfactory results in all of the particulate trapping properties, durability and regenerating properties. Moreover, these specimens also can reduce the SOF content in exhausts, so that there is no need to provide a catalytic converter. Thus, by using the particulate trap according to the present invention, it is possible to reduce the installation space and the manufacturing cost of the diesel exhaust after-treatment device.

EXPERIMENT 10

The following four kinds of specimens were prepared.

V, W: filter elements comprising, similar to the filter element of FIG. 2, concentrically arranged cylindrical filters having different diameters, with the reinforcing members 2-3 and 2-1 inserted, respectively, in the exhaust incoming spaces 3 and exhaust outgoing spaces 4 and the reinforcing members 2—2 provided at both ends, so that the filter element has the same sectional shape shown in FIG. 8 (Example of the invention)

X: filter element which is the same as Specimen V and W except that it has no reinforcing members (Comparative EXAMPLE)

I: honeycomb filter element considered to have a sufficient particulate trapping capacity (made of cordierite, by NIHON GAISHI, PHC-221) (Comparative Example).

Table 40 shows detailed data on these specimens. Table 41 shows detailed data on the reinforcing members 2-1, 2—2 and 2-3 used in Specimens V and w. Specimen I has a volume of 2.5 liters, i.e. the same volume as Specimens T, U and V.

The reinforcing members (2-1 and 2-3 in FIG. 8) of Specimen V has a NOx catalyst-carrying γ-alumina coating on the cermet substrate at the rate of 100 grams per liter of cermet, and Cu as a catalyst uniformly carried on the γ-alumina coating at the rate of 1.0 grams/liter.

The reinforcing members (2-1 and 2-3 in FIG. 8) of Specimen W has an SOF catalyst-carrying γ-alumina coating on the unwoven metal fabric substrate at the rate of 150 grams per liter of unwoven fabric, and Pt as a catalyst uniformly carried on the γ-alumina coating at the rate of 1.5 grams/liter.

Each specimen was subjected to the same endurance test and regeneration test as in EXPERIMENT 1. The test results are shown in Tables 42 and 43. There was no difference in the particulate trapping properties among the three specimens.

Specimens V and W according to the invention achieved satisfactory results in all of the particulate trapping properties, durability and regenerating properties.

For Specimen V, its NO purifying rate was measured.

In this test, $C_2H_4$ was introduced into exhaust gas as a reducing agent. The content of the exhaust gas is shown in Table 44.

The NO concentration was measured for two minutes while keeping the exhaust temperature at 250° C. Table 45 shows the average concentration.

From these tables, it is apparent that the NO concentration decreased to half by passing exhausts through Specimen T.

For Specimen W, its SOF purifying rate was measured.

This test was conducted while keeping the exhaust gas temperature at 250° C. and 350° C. The test results are shown in Table 46.

By passing exhausts through Specimen W carrying Pt as a catalyst, the SOF concentration decreased by 40% of 50%.

From these experiment results, it is apparent that only the Specimens V and W according to the present invention can achieve satisfactory results in all of the particulate trapping properties, durability and regerminative properties. Moreover, these specimens can reduce the NOx content (Specimen T) or the SOF content (Specimen U) in exhausts, so that there is no need to provide a catalytic converter. Thus, by using the particulate trap according to the present invention, it is possible to reduce the installation space and the manufacturing cost of the diesel exhaust after-treatment device.

EXPERIMENT 11

The following four kinds of specimens were prepared.

YA, YB: filter elements as shown FIG. 2 with the reinforcing members 2-1, 2—2, 2-3 inserted in the exhaust gas incoming spaces 3, outgoing spaces 4 and both adds, respectively, as shown in FIG. 8 (Example of the invention)

YC: filter element which is the same as specimens V and W but with no reinforcing members (Comparative Example)

I: honeycomb filter element considered to have a sufficient particulate trapping capacity (made of cordierite, by NIHON GAISHI, PHC-221) (Comparative Example).

Table 47 shows detailed data on these specimens.

Table 48 show details about the reinforcing members 2-1, 2—2 and 2-3 used for specimens YA and YB. Specimen I has a volume of 2.5 liters, i.e. the same volume as Specimens YA, YB and YC.

The reinforcing members (2-1 and 2-3 in FIG. 8) for of specimen YA has a NOx catalyst-carrying γ-alumina coating on the cermet substrate at the rate of 100 grams per liter of cermet, and Cu as a catalyst uniformly carried on the γ-alumina coating at the rate of 1.0 gram/liter.

The reinforcing members (2-1 and 2-3 in FIG. 8) for Specimen YB has a NOx catalyst-carrying γ-alumina coating on the cermet substrate at the rate of 150 grams per liter of cermet, and Pt as a catalyst uniformly carried on the γ-alumina coating at the rate of 1.5 gram/liter.

Each specimen was subjected to the same endurance test and regeneration test as in EXPERIMENT 1. The test results are shown in Table 49 and 50. There was no difference in the particulate trapping properties among the specimens.

Specimens YA and YB achieved satisfactory results in all of the particulate trapping properties, durability and regenerating properties.

For Specimen YA, we evaluated their NO purifying rates.

In this test $C_2H_4$ was introduced into exhausts as a reducing agent. The contents of the exhausts are shown in Table 51.

For each specimen the NO concentration was measured for two minutes while keeping the exhaust temperature at 250° C. Table 52 shows the average NO concentration.

From there tables, it is apparent that the NO concentration decreased to half by passing exhausts through Specimen YA.

For Specimen YB, its SOF purifying rate was measured.

This test was conducted while keeping the exhaust gas temperature at 250° C. and 350° C. The test results are shown in Table 53.

By passing exhausts through Specimen YB carrying Pt as a catalyst, the SOF concentration decreased by 40% or 50%.

From these experiment results, it is apparent that the Specimens YA and YB according to the present invention can achieve satisfactory results in all of the particulate trapping properties, durability and regenerating properties whereas the comparative examples YC and I cannot. Moreover, these specimens can reduce the NO and SOF contents in exhausts, so that there is no need to provide a catalytic converter. Thus, by using the particulate trap according to the prevent invention, it is possible to reduce the installation space and the manufacturing cost of the diesel exhaust after-treatment device.

TABLE 1

| | Filter element | | | | |
|---|---|---|---|---|---|
| | Material | Material | Thickness | Packing density | Filter area |
| Specimen A (Invented) | cermet #7 | Ni—Cr—Al | 0.8 mm | 20% | 1.3 m$^2$ |
| Specimen B (Comparative) | cermet #7 | Ni—Cr—Al | 0.8 mm | 20% | 1.3 m$^2$ |
| Specimen I (Comparative) | Cordierite | MgO—Al$_2$O$_3$—SiO$_2$ | 0.5 mm | 50% | 2.3 m$^2$ |

7 is model number, which indicates that the number of cells is 50–70 per unit lentgh (1 inch).

TABLE 2

| | Material | Material | Packing density | Heat resistance | Strength |
|---|---|---|---|---|---|
| Reinforcing member of Specimen A | cermet #[1] | Ni—Cr—Al | 5% | No deterioration when exposed to exhaust at 700° C. for 100 hours | No breakage under pressure of 0.3 kg/cm² by exhaust at 700° C. |

1 is model number, which indicates that the number of cells is 6–11 per unit length (1 inch).

TABLE 3

| Specimen | Results of endurance test (Temperature of exhaust at trap inlet: 700° C.) |
|---|---|
| Specimen A | No breakage after 120 hours |
| Specimen B | Breakage noticed after 100 hours |
| Spoeimen I | No breakage after 120 hours |

TABLE 4

| | Regeneration test result |
|---|---|
| Speciment A (Invented) | Not broken |
| Specimen B (Comparative) | Nor broken |
| Specimen I (Comparative) | Crack formed |

TABLE 5

| | Filter element | | | | |
|---|---|---|---|---|---|
| | Material | Material | Thickness | Packing density | Filter area |
| Specimen C (Invented) | cermet #7 with metal fabrics packed | Ni—Cr—Al | 1.0 mm | 30% | 1.3 m² |
| Specimen D (Comparative) | cermet #7 with metal fabrics packed | Ni—Cr—Al | 1.0 mm | 30% | 1.3 m² |
| Specimen I (Comparative) | Cordierite | MgO—Al₂O₃—SiO₂ | 0.5 mm | 50% | 2.3 m² |

TABLE 6

| | Material | Material | Packing density | Heat resistance | Strength |
|---|---|---|---|---|---|
| Reinforcing member 2-1 | wire gauze | Fe—Cr—Al | 20% | No deterioration when exposed to exhaust at 700° C. for 100 hours | No breakage under pressure of 0.3 kg/cm² by exhaust at 700° C. |
| Reinforcing member 2-2 | cermet #[2] | Ni—Cr—Al | 5% | No deterioration when exposed to exhaust at 700° C. for 100 hours | No breakage under pressure of 0.3 kg/cm² by exhaust at 700° C. |

² is mdoel number, which indicates that the number of cells is 11–17 per unit length (1 inch).

TABLE 7

| Specimen | Results of endurance test (Temperature of exhaust at trap inlet: 800° C.) |
|---|---|
| Specimen C | No breakage after 150 hours |
| Specimen D | Breakage noticed after 120 hours |
| Specimen I | No breakage after 150 hours |

TABLE 8

| | Regeneration test result |
|---|---|
| Specimen C (Invented) | Not broken |
| Specimen D (Comparative) | Not broken |
| Specimen I (Comparative) | Crack formed |

TABLE 9

| | Filter element | | | | |
|---|---|---|---|---|---|
| | Material | Material | Thickness | Packing density | Filter area |
| Specimen E (Invented) | cermet #7 with ceramic fabrics packed | cermet: Ni—Cr—Al Al ceremic fabrics:Al$_2$O$_3$ | 1.0 mm | Exhaust inlet:20% outlet:40% | 1.4 m$^2$ |
| Specimen F (Comparative) | cermet #7 with ceramic fabrics packed | cermet: Ni—Cr—Al Al ceramic fabrics:Al$_2$O$_3$ | 1.0 mm | Exhaust inlet:20% outlet:40% | 1.4 m$^2$ |
| Specimen I (Comparative) | Cordierite | MgO—Al$_2$O$_3$—SiO$_2$ | 0.5 mm | 50% | 2.3 m$^2$ |

TABLE 10

| | Material | Material | Packing density | Heat resistance | Strength |
|---|---|---|---|---|---|
| Reinforcing member 2-1 | cermet #2 | Ni—Cr—Al | 5% | No deterioration when exposed to exhaust at 700° C. for 100 hours | No breakage under pressure of 0.3 kg/cm$^2$ by exhaust at 700° C. |
| Reinforcing member 2-2 | punching metal | Fe—Cr—Al | 15% | No deterioration when exposed to exhaust at 700° C. for 100 hours | No breakage under pressure of 0.3 kg/cm$^2$ by exhaust at 700° C. |

TABLE 11

| Specimen | Results of endurance test (Temperature of exhaust at trap inlet: 800° C.) |
|---|---|
| Specimen E | No breakage after 120 hours |
| Specimen F | Breakage noticed after 100 hours |
| Spceimen I | No breakage after 120 hours |

TABLE 12

| | Regeneration test result |
|---|---|
| Specimen E (Invented) | Not broken |
| Specimen F (Comparative) | Not broken |
| Specimen I (Comparative) | Crack formed |

TABLE 13

| | Filter element | | | | |
|---|---|---|---|---|---|
| | Material | Material | Thickness | Packing density | Filter area |
| Specimen G (Invented) | cermet #7 | Ni—Cr—Al | 1.0 mm | 15% | 1.3 m$^2$ |
| Specimen H (Comparative) | cermet #7 | Ni—Cr—Al | 1.0 mm | 15% | 1.3 m$^2$ |
| Specimen I (Comparative) | Cordierite | MgO—Al$_2$O$_3$—SiO$_2$ | 0.5 mm | 50% | 2.3 m$^2$ |

TABLE 14

| | Material | Material | Packing density | Heat resistance | Strength |
|---|---|---|---|---|---|
| Reinforcing member of Specimen G | cermet #1 | Ni—Cr—Al | 5% | No deterioration when exposed to exhaust at 700° C. for 100 hours | No breakage under pressure of 0.3 kg/cm$^2$ by exhaust at 700° C. |

TABLE 15

| Specimen | Results of endurance test (Temperature of exhaust at trap inlet: 700° C. |
|---|---|
| Specimen G | No breakage after 120 hours |
| Specimen H | Breakage noticed after 100 hours |
| Specimen I | No breakage after 120 hours |

TABLE 16

| | Regeneration test result |
|---|---|
| Specimen G (Invented) | Not broken |
| Specimen H (Comparative) | Not broken |
| Specimen I (Comparative) | Crack formed |

TABLE 17

| | Filter element | | | | | |
|---|---|---|---|---|---|---|
| | Material | Material | Thickness | Packing density | Filter element used | Filter area |
| Specimen J (Invented) | cermet #7 | Ni—Cr—Al | 0.5 mm | 20% | cylindrical 10, 15, 20, 25, 30 and 35 mm radius | 1.3 m² |
| | cermet #6 | Ni—Cr—Al | 0.75 mm | 20% | cylindrical 40, 45 and 50 mm radius | |
| | cermet #5 | Ni—Cr—Al | 1.0 mm | 20% | cylindrical 55, 60, 65 and 70 mm radius | |
| | cermet #4 | Ni—Cr—Al | 1.25 mm | 20% | cylindrical 75, 80 and 85 mm radius | |
| Specimen K (Comparative) | cermet #7 | Ni—Cr—Al | 0.5 mm | 20% | all filter elements | 1.3 m² |
| Specimen I (Comparative) | Cordierite | MgO—Al₂O₃—SiO₂ | 0.5 mm | 50% | all filter elements | 2.3 m² |

4, #5, #6 and #7 are model numbers, which indicates that the number of cells is 26–35, 35–44, 44–55 and 50–70 per unit length (1 inch), respectively.

TABLE 18

| | Pressure at which buckling occured (in KPa) |
|---|---|
| Specimen J (Invented) | 200 |
| Specimen K (Comparative) | 34 |

TABLE 19

| Specimen | Results of endurance test (Temperature of exhaust at trap inlet: 800° C.) |
|---|---|
| Specimen J | No breakage after 150 hours |
| Specimen K | Breakage noticed after 120 hours |
| Specimen I | No breakage after 150 hours |

TABLE 20

| | Regeneration test result |
|---|---|
| Specimen J (Invented) | Not broken |
| Specimen K (Comparative) | Not broken |
| Specimen I (Comparative) | Crack formed |

TABLE 21

| | Filter element | | | | | |
|---|---|---|---|---|---|---|
| | Material | Material | Thickness | Packing density | Filter element used | Filter area |
| Specimen L (Invented) | cermet #7 with metal fabrics packed | Ni—Cr—Al | 0.5 mm | 30% | tapered elements 1) 0 × 20 mm radius 2) 20 × 30 mm radius 3) 30 × 40 mm radius | 1.3 m² |
| | cermet #6 with metal fabrics packed | Ni—Cr—Al | 1.0 mm | 30% | tapered elements 1) 40 × 50 mm radius 2) 50 × 60 mm radius 3) 60 × 70 mm radius | |
| | cermet #5 with metal fabrics packed | Ni—Cr—Al | 1.5 mm | 30% | tapered elements 1) 80 × 90 mm radius 2) 90 × 100 mm radius 3) 100 × 110 mm radius 4) 110 × 120 mm radius | |
| Specimen M (Comparative) | cermet #7 with metal fabrics packed | Ni—Cr—Al | 0.5 mm | 30% | all filter elements | 1.3 m² |
| Specimen I (Comparative) | Cordierite | MgO—Al₂O₃—SiO₂ | 0.5 mm | 50% | all filter elements | 2.3 m² |

TABLE 22

| | Pressure at which buckling occured (in KPa) |
|---|---|
| Specimen L (Invented) | 140 |
| Specimen M (Comparative) | 16 |

TABLE 24

| | Regeneration test result |
|---|---|
| Specimen L (Invented) | Not broken |
| Specimen M (Comparative) | Not broken |
| Specimen I (Comparative) | Crack formed |

TABLE 25

| | Filter element | | | | | |
|---|---|---|---|---|---|---|
| | Material | Material | Thickness | Packing density | Filter element used | Filter area |
| Specimen N (Invented) | cermet #7 with ceramic fabrics packed | Ni—Cr—Al Al ceramic fabrics: Al₂O₃ | 0.75 mm | Exhaust inlet: 20% outlet: 40% | cylindrical 10, 20, 30 and 40 mm radius | 1.3 m² |
| | cermet #7 with ceramic fabrics packed | Ni—Cr—Al Al ceramic fabrics: Al₂O₃ | 1.5 mm | Exhaust inlet: 20% outlet: 40% | cylindrical 10, 20, 30 and 40 mm radius | |
| Specimen O (Comparative) | cermet #7 with ceramic fabrics packed | Ni—Cr—Al Al ceramic fabrics: Al₂O₃ | 0.75 mm | Exhaust inlet: 20% outlet: 40% | all filter elements | 1.3 m² |
| Specimen I (Comparative) | Cordierite | MgO—Al₂O₃—SiO₂ | 0.5 mm | 50% | all filter elements | 2.3 m² |

TABLE 23

| Specimen | Results of endurance test (Temperature of exhaust at trap inlet: 800° C.) |
|---|---|
| Specimen L | No breakage after 120 hours |
| Specimen M | Breakage noticed after 100 hours |
| Specimen I | No breakage after 120 hours |

TABLE 26

| | Pressure at which buckling occured (in KPa) |
|---|---|
| Specimen N (Invented) | 340 |
| Specimen O (Comparative) | 85 |

TABLE 27

| Specimen | Results of endurance test (Temperature of exhaust at trap inlet: 800° C.) |
|---|---|
| Specimen N | No breakage after 150 hours |
| Specimen O | Breakage noticed after 120 hours |
| Specimen I | No breakage after 150 hours |

TABLE 28

| | Regeneration test result |
|---|---|
| Specimen N (Invented) | Not broken |
| Specimen O (Comparative) | Not broken |
| Specimen I (Comparative) | Crack formed |

TABLE 29

| | Filter element | | | | |
|---|---|---|---|---|---|
| | Material | Material | Thickness | Packing density | Filter area |
| Specimen P (Invented) | (1) cermet #4 + $\gamma$-$Al_2O_3$ + Cu<br>(2) cermet #7<br>(3) cermet #4 + $\gamma$-$Al_2O_3$ + Cu | (1) Ni—Cr—Al + $\gamma$-$Al_2O_3$ + Cu<br>(2) Ni—Cr—Al<br>(3) Ni—Cr—Al + $\gamma$-$Al_2O_3$ + Cu | 1.0 mm | 20% | 1.3 $m^2$ |
| Specimen Q (Invented) | cermet #7 | Ni—Cr—Al | 1.0 mm | 20% | 1.3 $m^2$ |
| Specimen R (Comparative) | cermet #7 | Ni—Cr—Al | 1.0 mm | 20% | 1.3 $m^2$ |
| Specimen I (Comparative) | Cordierite | MgO—$Al_2O_3$—$SiO_2O_2$ | 1.0 mm | 50% | 2.3 $m^2$ |

4 and #7 are model numbers, which indicates that the number of cells is 26–35 and 50–70 per unit length (1 inch), respectively.

TABLE 30

| | Material | Material | Packing density | Heat resistance | Strength |
|---|---|---|---|---|---|
| Reinforcing member of Specimen P | cermet #1 | Ni—Cr—Al | 5% | No deterioration when exposed to exhaust at 700° C. for 100 hours | No breakage under pressure of 0.3 kg/$cm^2$ by exhaust at 700° C. |
| Reinforcing member of Specimen Q | cermet #1 | Ni—Cr—Al + $\gamma$-$Al_2O_3$ + Cu | 5% | No deterioration when exposed to exhaust at 700° C. for 100 hours | No breakage under pressure of 0.3 kg/$cm^2$ by exhaust at 700° C. |

1 is model number, which indicates that the number of cells is 6–11 per unit length (1 inch).

TABLE 31

| Specimen | Results of endurance test (Temperature of exhaust at trap inlet: 700° C.) |
|---|---|
| Specimen P | No breakage after 150 hours |
| Specimen Q | No breakage after 150 hours |
| Specimen R | Breakage noticed after 120 hours |
| Specimen I | No breakage after 150 hours |

TABLE 32

| | Regeneration test result |
|---|---|
| Specimen P | Not broken |
| Specimen Q | Not broken |
| Specimen R | Not broken |
| Specimen I | Crack formed |

TABLE 33

| Item | Condition |
|---|---|
| NO concentration in exhausts | 1000 ppm |
| $C_2H_4$ concentration in exhausts | 250 ppm |
| $O_2$ concentration in exhausts | 2% |
| Exhaust temperature | 250° C. |

TABLE 34

|  | NO concentration |
|---|---|
| Specimen P | 500 ppm |
| Specimen Q | 500 ppm |

TABLE 35

|  | Filter element | | | | |
|---|---|---|---|---|---|
|  | Material | Material | Thickness | Packing density | Filter area |
| Specimen S (Invented) | (1) cermet #4 + γ-Al$_2$O$_3$ + Pt (2) cermet #7 (3) cermet #4 + γ-Al$_2$O$_3$ + Pt | (1) Ni—Cr—Al + γ-Al$_2$O$_3$ + Pt (2) Ni—Cr—Al (3) Ni—Cr—Al + γ-Al$_2$O$_3$ + Pt | 1.0 mm | 20% | 1.3 m$^2$ |
| Specimen T (Invented) | cermet #7 | Ni—Cr—Al | 1.0 mm | 20% | 1.3 m$^2$ |
| Specimen U (Comparative) | cermet #7 | Ni—Cr—Al | 1.0 mm | 20% | 1.3 m$^2$ |
| Specimen I (Comparative) | Cordierite | MgO—Al$_2$O$_3$—SiO$_2$O$_2$ | 1.0 mm | 50% | 2.3 m$^2$ |

4 and #7 are model numbers, which indicates that the number of cells is 26–35 and 50–70 per unit length (1 inch), respectively.

TABLE 36

|  | Material | Material | Packing density | Heat resistance | Strength |
|---|---|---|---|---|---|
| Reinforcing member 2-1 of Specimen S | wire gauge | Fe—Cr—Al | 20% | No deterioration when exposed to exhaust at 700° C. for 100 hours | No breakage under pressure of 0.3 kg/cm$^2$ by exhaust at 700° C. |
| Reinforcing member 2-2 of Specimen S | cermet #2 | Ni—Cr—Al | 5% | No deterioration when exposed to exhaust at 700° C. for 100 hours | No breakage under pressure of 0.3 kg/cm$^2$ by exhaust at 700° C. |
| Reinforcing member 2-1 of Specimen T | wire gauge | Fe—Cr—Al | 20% | No deterioration when exposed to exhaust at 700° C. for 100 hours | No breakage under pressure of 0.3 kg/cm$^2$ by exhaust at 700° C. |
| Reinforcing member 2-2 of Specimen T | cermet #2 | Ni—Cr—Al + γ-Al$_2$O$_3$ + Pt | 5% | No deterioration when exposed to exhaust at 700° C. for 100 hours | No breakage under pressure of 0.3 kg/cm$^2$ by exhaust at 700° C. |

2 is model number, which indicates that the number of cells is 11–17 per unit length (1 inch).

TABLE 37

| Specimen | Results of endurance test (Temperature of exhaust at trap inlet: 700° C.) |
|---|---|
| Specimen S | No breakage after 150 hours |
| Specimen T | No breakage after 150 hours |
| Specimen U | Breakage noticed after 120 hours |
| Specimen I | No breakage after 150 hours |

TABLE 38

|  | Regeneration test result |
|---|---|
| Specimen S | Not broken |
| Specimen T | Not broken |
| Specimen U | Not broken |
| Specimen I | Crack formed |

TABLE 39

| | SOF removing rate (%) | |
|---|---|---|
| | Exhaust temperature 250° C. | Exhaust temperature 350° C. |
| Specimen S | 40 | 50 |
| Specimen T | 40 | 50 |

TABLE 40

| | Filter element | | | | |
|---|---|---|---|---|---|
| | Material | Material | Thickness | Packing density | Filter area |
| Specimen V (Invented) | cermet #7 | Ni—Cr—Al | 0.5 mm | 20% | 1.3 m$^2$ |
| Specimen W (Invented) | cermet #7 | Ni—Cr—Al | 0.5 mm | 20% | 1.3 m$^2$ |
| Specimen X (Comparative) | cermet #7 | Ni—Cr—Al | 0.5 mm | 20% | 1.3 m$^2$ |
| Specimen I (Comparative) | Cordierite | MgO—Al$_2$O$_3$—SiO$_2$ | 0.5 mm | 50% | 2.3 m$^2$ |

TABLE 41

| | Material | Material | Packing density | Heat resistance | Strength |
|---|---|---|---|---|---|
| Reinforcing member 2-1, 2-3 of Specimen V | cermet#2 | Ni—Cr—Al + γ-Al$_2$O$_3$ + Cu | 5% | No deterioration when exposed to exhaust at 700° C. for 100 hours | No breakage under pressure of 0.3 kg/cm$^2$ by exhaust at 700° C. |
| Reinforcing member 2-1, 2-3 of Specimen W | cermet#2 | Ni—Cr—Al + γ-Al$_2$O$_3$ + Pt | 5% | No deterioration when exposed to exhaust at 700° C. for 100 hours | No breakage under pressure of 0.3 kg/cm$^2$ by exhaust at 700° C. |

2 is model number, which indicates that the number of cells is 11-17 per unit length (1 inch).

TABLE 42

| Specimen | Results of endurance test (Temperature of exhaust at trap inlet: 700° C.) |
|---|---|
| Specimen V | No breakage after 150 hours |
| Specimen W | No breakage after 150 hours |
| Specimen X | Breakage noticed after 120 hours |
| Specimen I | No breakage after 150 hours |

TABLE 43

| | Regeneration test result |
|---|---|
| Specimen V | Not broken |
| Specimen W | Not broken |
| Specimen X | Not broken |
| Specimen I | Crack formed |

TABLE 44

| Item | Condition |
|---|---|
| NO concentration in exhausts | 1000 ppm |
| C$_2$H$_4$ concentration in exhausts | 250 ppm |
| O$_2$ concentration in exhausts | 2% |
| Exhaust temperature | 250° C. |

TABLE 45

| | NO concentration |
|---|---|
| Specimen V | 500 ppm |

TABLE 46

| | SOF removing rate (%) | |
|---|---|---|
| | Exhaust temperature 250° C. | Exhaust temperature 350° C. |
| Specimen W | 40 | 50 |

TABLE 47

| | Filter element | | | | |
|---|---|---|---|---|---|
| | Material | Material | Thickness | Packing density | Filter area |
| Specimen YA (Invented) | cermet #7 | Fe—Cr—Al | 0.5 mm | 20% | 1.3 m$^2$ |
| Specimen YB (Invented) | cermet #7 | Fe—Cr—Al | 0.5 mm | 20% | 1.3 m$^2$ |
| Specimen YC (Invented) | cermet #7 | Fe—Cr—Al | 0.5 mm | 20% | 1.3 m$^2$ |
| Specimen I (Comparative) | Cordierite | MgO—Al$_2$O$_3$—SiO$_2$ | 0.5 mm | 50% | 2.3 m$^2$ |

TABLE 48

| | Material | Material | Packing density | Heat resistance | Strength |
|---|---|---|---|---|---|
| Reinforcing member 2-1, 2-3 of Specimen YA | cermet[#2] | Fe—Cr—Al + $\gamma$-$Al_2O_3$ + Cu | 7% | No deterioration when exposed to exhaust at 700° C. for 100 hours | No breakage under pressure of 0.3 kg/$cm^2$ by exhaust at 700° C. |
| Reinforcing member 2-1, 2-3 of Specimen YB | cermet[#2] | Ni—Cr—Al + $\gamma$-$Al_2O_3$ + Pt | 7% | No deterioration when exposed to exhaust at 700° C. for 100 hours | No breakage under pressure of 0.3 kg/$cm^2$ by exhaust at 700° C. |

[#2] is model number, which indicates that the number of cells is 11–17 per unit length (1 inch).

TABLE 49

| Specimen | Results of endurance test (Temperature of exhaust at trap inlet: 700° C.) |
|---|---|
| Specimen YA | No breakage after 150 hours |
| Specimen YB | No breakage after 150 hours |
| Specimen YC | Breakage noticed after 120 hours |
| Specimen I | No breakage after 150 hours |

TABLE 50

| | Regeneration test result |
|---|---|
| Specimen YA (Invented) | Not broken |
| Specimen YB (Invented) | Not broken |
| Specimen YC (Invented) | Not broken |
| Specimen I (Comparative) | Crack formed |

TABLE 51

| Item | Condition |
|---|---|
| NO concentration in exhausts | 1000 ppm |
| $C_2H_4$ concentration in exhausts | 250 ppm |
| $O_2$ concentration in exhausts | 2% |
| Exhaust temperature | 250° C. |

TABLE 52

| | NO concentration |
|---|---|
| Specimen YA (Invented) | 500 ppm |

TABLE 53

| | SOF removing rate (%) | |
|---|---|---|
| | Exhaust temperature 250° C. | Exhaust temperature 350° C. |
| Specimen YB | 40 | 50 |

What is claimed is:

1. A particulate trap for use in a diesel engine including a filter element comprising a plurality of filters made of three-dimensionally reticulated porous member comprising heat-resistant metal substrate having holes communicating with one another, said filters defining alternating, longitudinally extending exhaust incoming spaces end exhaust outgoing spaces between adjacent said filters, said exhaust incoming spaces having their outlet ends closed, said exhaust outgoing spaces having their inlet ends closed, said filter element being mounted in a container provided in an exhaust line of a diesel engine, wherein filter reinforcing members permeable to exhaust gases are provided in said exhaust outgoing spaces, at both ends of said filters, or both in said exhaust outgoing spaces and at both ends of said filters.

2. A particulate trap for a diesel engine as claimed in claim 1 wherein said filter reinforcing members permeable to exhaust gases are provided in said exhaust incoming spaces.

3. A particulate trap for a diesel engine as claimed in claim 2 wherein said reinforcing members provided in said exhaust incoming spaces occupy the entire area of said exhaust incoming spaces.

4. A particulate trap for a diesel engine as claimed in claim 1 wherein the reinforcing members provided in said exhaust outgoing spaces occupy the entire exhaust outgoing spaces.

5. A particulate trap for a diesel engine as claimed in claim 1 wherein said reinforcing members provided at both ends of said filters have protrusions and recesses kept in engagement with both ends of said filters.

6. A particulate trap for a diesel engine as claimed in claim 1 wherein said reinforcing members have a material filling rate of 30% or less and are made of a heat-resistant metal in the form of a three-dimensionally reticulated porous member, wire gauze, metal fiber unwoven fabric, corrugated sheet or punching metal.

7. A particulate trap as claimed in claim 1 wherein each said filter is made of at least two different kinds of filter materials having different pore diameters, the filter material having a larger pore diameter being provided nearer to the exhaust inlet side.

8. A particulate trap for diesel engine use as claimed in claim 1 wherein exhaust inlets and outlets defined between said filters have a width not exceeding 10 mm.

9. A particulate trap for a diesel engine as claimed in claim 1 wherein a catalyst is carried on one or either side of each said filter of said filter element.

10. A particulate trap for a diesel engine as claimed in claim 1 wherein each said filter of said filter element is provided on one or either side thereof with a three-dimensionally reticulated porous member made of a heat-resistant metal and having continuous holes, said three-dimensionally reticulated porous member carrying a catalyst.

11. A particulate trap for a diesel engine as claimed in claims 1 wherein alumina whiskers are grown on said filters of said filter element.

12. A particulate trap for use in a diesel engine including a filter element comprising a plurality of untapered cylindrical or tapered filters made of three-dimensionally reticulated porous member comprising heat-resistant metal substrate having holes communicating with one another, said filters having different diameters from one another and arranged concentrically to define alternating, longitudinally extending, concentric exhaust incoming spaces and exhaust outgoing spaces between said adjacent filters and inside the filter of the smallest diameter, said exhaust incoming spaces having their outlet ends closed, said exhaust outgoing spaces having their inlet ends closed, and said filter element being mounted in a container provided in an exhaust line of a diesel engine, wherein the filters having larger diameters are thicker than the filters having smaller diameters.

13. A particulate trap for a diesel engine as claimed in claim 12 wherein the thicker, outer cylindrical filters are coarse.

* * * * *